(12) United States Patent
Yang

(10) Patent No.: US 8,006,625 B2
(45) Date of Patent: Aug. 30, 2011

(54) TUBE CAR, NETWORK OF TUBES, PERSONAL TRANSPORT SYSTEM, AND CONTROL SYSTEM AND CONTROL METHOD THEREOF

(76) Inventor: Nanzheng Yang, Beijing (CN)

( * ) Notice: Subject to any disclaimer, the term of this patent is extended or adjusted under 35 U.S.C. 154(b) by 258 days.

(21) Appl. No.: 11/909,907

(22) PCT Filed: Apr. 14, 2006

(86) PCT No.: PCT/CN2006/000682
§ 371 (c)(1),
(2), (4) Date: Sep. 30, 2008

(87) PCT Pub. No.: WO2006/108360
PCT Pub. Date: Oct. 19, 2006

(65) Prior Publication Data
US 2009/0101040 A1    Apr. 23, 2009

(30) Foreign Application Priority Data
Apr. 15, 2005    (CN) .......................... 2005 1 0056657

(51) Int. Cl.
*B61B 13/10* (2006.01)
(52) U.S. Cl. ............... 104/138.1; 104/156; 104/159; 104/130.07; 414/236; 414/237; 414/331.04
(58) Field of Classification Search .......... 104/138.1, 104/156, 159, 27, 28, 23.2, 130.07; 414/236, 414/237, 331.04
See application file for complete search history.

(56) References Cited

U.S. PATENT DOCUMENTS

| | | | | |
|---|---|---|---|---|
| 1,061,035 A | * | 5/1913 | Batcheller | 104/119 |
| 3,403,634 A | * | 10/1968 | Crowder | 104/138.1 |
| 3,404,638 A | * | 10/1968 | Edwards | 104/156 |
| 3,601,158 A | * | 8/1971 | Edwards | 138/106 |

(Continued)

FOREIGN PATENT DOCUMENTS
CN          1173851 A      2/1998
(Continued)

OTHER PUBLICATIONS

European Search Report dated Feb. 3, 2009 for Application No. 06722331.3.

*Primary Examiner* — S. Joseph Morano
*Assistant Examiner* — Jason C Smith
(74) *Attorney, Agent, or Firm* — Evan Law Group LLC

(57) ABSTRACT

The present invention provides a new personal transport system for passengers and goods, which comprises: a tube car comprising a self-powered closed tube car carrying passengers or goods from door to door; and a network of tubes comprising a plurality of tubes, the said network of tubes combined with the existing blocks or buildings, with each tube in the network of tubes provided with an upper rail and/or a lower rail for supporting and/or guiding the said tube car carrying passengers or goods. According to the invention it is possible to achieve a door-to-door transport between two buildings. In comparison to other traffic systems, the inventive system's velocity, line capacity, safety and reliability, ability of resisting disasters and comfortableness are much increased while its consumption of energy, construction cost, occupied space, operating cost, noise and visual pollution are greatly reduced. Furthermore, the transport system of the invention is easy to put into a standardized production, quick to be laid, removed and reused.

24 Claims, 13 Drawing Sheets

U.S. PATENT DOCUMENTS

| | | | | |
|---|---|---|---|---|
| 3,734,428 A * | 5/1973 | Alexandrov et al. | ......... | 406/185 |
| 3,749,026 A * | 7/1973 | Carrasse | ......... | 104/156 |
| 3,776,141 A * | 12/1973 | Gelhard et al. | ......... | 104/123 |
| 3,797,405 A * | 3/1974 | Carstens et al. | ......... | 406/105 |
| 3,954,064 A * | 5/1976 | Minovitch | ......... | 104/138.1 |
| 3,985,081 A * | 10/1976 | Sullivan, II | ......... | 104/23.2 |
| 3,999,487 A * | 12/1976 | Valverde | ......... | 104/138.1 |
| 4,017,039 A * | 4/1977 | Carstens | ......... | 406/105 |
| 4,018,410 A * | 4/1977 | Renaux | ......... | 705/8 |
| 4,023,500 A * | 5/1977 | Diggs | ......... | 104/138.1 |
| 4,036,146 A * | 7/1977 | Tyus | ......... | 104/307 |
| 4,072,109 A * | 2/1978 | Kovanov et al. | ......... | 104/138.1 |
| 4,075,947 A * | 2/1978 | Soschenko et al. | ......... | 104/23.2 |
| 4,108,077 A * | 8/1978 | Laing | ......... | 104/156 |
| 4,113,202 A * | 9/1978 | Ueno | ......... | 406/185 |
| 4,166,419 A * | 9/1979 | Ardeleanu | ......... | 104/138.1 |
| 4,182,243 A * | 1/1980 | Ceauselu | ......... | 104/138.1 |
| 4,458,602 A * | 7/1984 | Vandersteel | ......... | 104/138.1 |
| 4,630,961 A * | 12/1986 | Hellwig | ......... | 404/1 |
| 4,703,697 A * | 11/1987 | Bell | ......... | 104/23.1 |
| 4,841,871 A * | 6/1989 | Leibowitz | ......... | 104/23.1 |
| 4,881,469 A * | 11/1989 | Hirtz | ......... | 104/23.1 |
| 4,899,665 A * | 2/1990 | La Sorte | ......... | 104/23.1 |
| 4,940,368 A * | 7/1990 | Marcu | ......... | 406/79 |
| 5,253,590 A * | 10/1993 | Marusak | ......... | 104/138.1 |
| 5,537,929 A * | 7/1996 | Miura et al. | ......... | 104/156 |
| 5,720,363 A * | 2/1998 | Kipp | ......... | 186/55 |
| 5,909,710 A * | 6/1999 | Cummins | ......... | 104/23.2 |
| 6,178,892 B1 * | 1/2001 | Harding | ......... | 104/155 |
| 6,279,485 B1 * | 8/2001 | Schlienger | ......... | 104/156 |
| 6,318,274 B1 * | 11/2001 | Park | ......... | 104/88.02 |
| 6,418,856 B2 * | 7/2002 | Hossfield et al. | ......... | 104/130.01 |
| 6,644,209 B2 * | 11/2003 | Cummins | ......... | 104/156 |
| 6,810,817 B1 * | 11/2004 | James | ......... | 104/88.04 |
| 6,877,439 B2 * | 4/2005 | Chapman | ......... | 104/118 |
| 2003/0010872 A1 * | 1/2003 | Lewin et al. | ......... | 246/122 R |
| 2003/0101896 A1 * | 6/2003 | Cummins | ......... | 104/156 |
| 2009/0101040 A1 * | 4/2009 | Yang | ......... | 104/138.1 |

FOREIGN PATENT DOCUMENTS

| | | |
|---|---|---|
| CN | 1424213 A | 6/2003 |
| CN | 1429726 A | 7/2003 |
| CN | 1441737 A | 9/2003 |
| CN | 2585799 Y | 11/2003 |
| CN | 1468183 A | 1/2004 |
| CN | 1483621 A | 3/2004 |
| CN | 2681950 Y | 3/2005 |
| DE | 2 213 210 | 10/1973 |
| GB | 2391524 A | 2/2004 |
| JP | 48-67903 | 9/1973 |
| JP | 58-118443 | 7/1983 |
| JP | 2-164660 | 6/1990 |
| JP | 5-125844 | 5/1993 |
| JP | 6-336161 | 12/1994 |
| JP | 2005-14784 | 1/2005 |
| WO | WO 86/07397 | 12/1986 |
| WO | WO 98/24673 | 6/1998 |
| WO | WO 99/19195 | 4/1999 |
| WO | WO 00/18629 | 4/2000 |
| WO | WO 02/20325 A1 | 3/2002 |
| WO | WO 02/070317 A1 | 12/2002 |

* cited by examiner

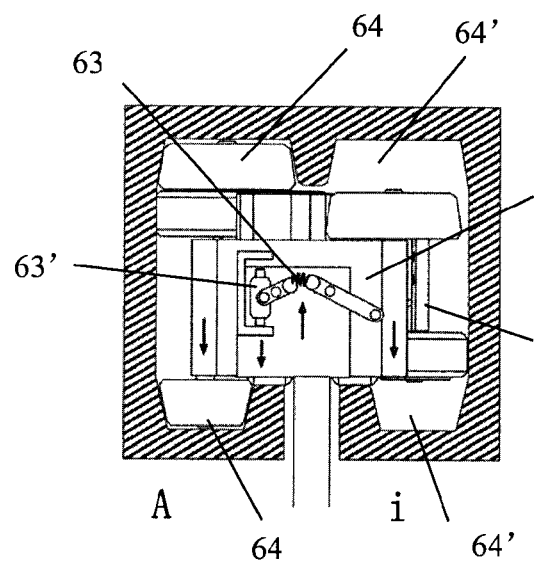 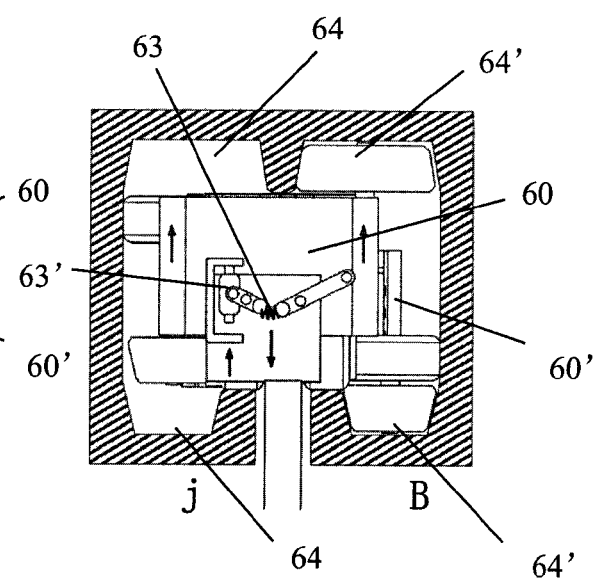
Fig.15A  Fig.15B
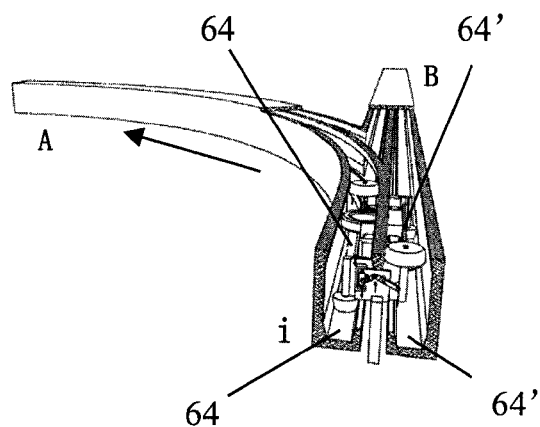 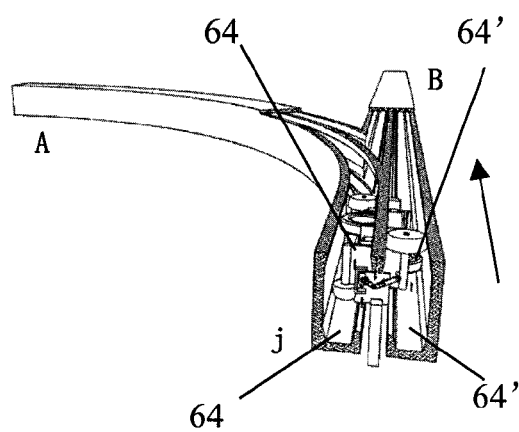
Fig.16A  Fig.16B

TUBE CAR, NETWORK OF TUBES, PERSONAL TRANSPORT SYSTEM, AND CONTROL SYSTEM AND CONTROL METHOD THEREOF

TECHNICAL FIELD

The present invention relates to a tube car used in a transport system, a closed network of tubes used in a transport system, a transport system comprising the car and the network of tubes, and the control system and method used in the transport system. According to the present invention, a personal transport system called as "horizontal-running elevator" is established to provide door-to-door transport of passengers or goods.

RELATED PRIOR ART

As automobiles and planes are becoming popular transport facilities, traffic congestion, accidents, pollutions, energy crisis, and rapid city expansion are gradually becoming serious social problems. According to the estimation of relevant experts, the urban economic loss due to traffic congestion is as high as tens of millions of US dollars, hundreds of thousands of people die in traffic accidents of the world each year, the pollutions caused by traffic, for example air pollution and noise pollution, and glacier melting and sea level rise resulting from greenhouse effect are increasingly serious threats on the human living environment, and very rapid expansion of cities lead to the worse shortage of previous land and freshwater resources. In an effort to solve the aforesaid problems, some solutions have been proposed, for example, to develop public transport systems in cities, including bus rapid transport (BRT), light rail transport, metro, and intercity high-speed railway. However, current public transport modes have some disadvantages including high construction cost, low speed, complicated transfer, uncomfortable ride and failure to provide door-to-door service, and cannot meet the new demands for transport personalization.

In order to solve the above-mentioned problems, many technical solutions have been proposed, and typical examples of them are Chinese patent application Nos. CN1173851A, CN1429726A, CN1483621A and Chinese patent No. CN2585799Y, as well as U.S. Pat. Nos. 4,018,410A, 4,630,961A, 4,841,871A, 5,720,363A and 6,318,274B1, which includes SKYLOOP, SKYCAR, SKYTRAN, electronic taxi, and other personal rapid transport (PRT) system solutions. But these technical solutions have the following common defects: they all utilize cross lines and loop lines (for example clover-leaf form of intersections of lines), and "dough twist" lines (for example, clip-form of station entry/exit lines) network, with complicated structure, more land occupied, low efficiency; open rails are used generally, causing bad operating conditions, lack of safety and low density of cars; horizontal-stretching stations are utilized, the stations separated from car storehouses; impossible connection with intercity transport system and failure to provide door-to-door transport; limited scale and non flexibility resulting from general connection-oriented centralized control; connection-oriented centralized control and static line response control technology being applied generally, which leads to impossible change of destinations on the way, slow response to roundabout control in case of network faults, and overall adjustment required for the control system in case of any changes of city layout. So many disadvantages and defects lead to that these technical solutions cannot completely comply with existing roads in cities and cannot comply with each other in terms of functions, and cannot seamlessly connect with intercity high-speed transport systems.

Besides, in order to overcome air resistance and increase travel speed, evacuated or low-air-pressure tube transport (ETT) technology has been developed. However, this technology is not applicable to urban areas where there are dense population and buildings. In the meanwhile, air resistance is not important for energy consumption when a train or car runs at a low speed. In this context, creating a low-air-pressure environment will require high cost but bring little value. Besides, this technology cannot provide an effective solution to anti-collision when network of tubes is complicated and cars' density is high. Therefore, this technology is not a good solution to the personal transport problems for the integration of intracity and intercity transports. It is also difficult to meet the geological conditions required for high-accuracy and heavy-load line of this technology. And if unclosed tube wall is applied for the low-air-pressure tube, it will cause few material alternatives, and high construction cost, but closed tube wall cannot meet the passenger's demands for sightseeing. These problems restrict the application of the evacuated or low-air-pressure tube transport (ETT) technology.

Container tube line technology is also one of existing technologies for reference. For this technology, power for running completely comes from air pressure difference and the container itself does not have the capability for controlling the movement. Therefore, it is difficult for this tube transport technology to enable containers to form steady running speed when the containers passes a diverging turnout or a converging joint of two lines, and this technology cannot avoid containers collision when they enters air-valve-type turnouts. Therefore this technology cannot meet the stability, safety and comfort requirements for passenger transport.

Elevator technology has already been widely applied in high-rise buildings in cities, and it is another existing technology available for reference. Ordinary high-speed elevators utilize full closed cars and apply automatic control circuits to complete the acceptance and reservation of passengers' commands and automatic control of car movement. Electrically-driven steel rope winch elevating system allows the car to complete its automatic moving up and down. However, all the existing elevator technologies can allow cars to move neither in horizontal direction nor along changed running course.

All in all, up to the present time there is not a complete solution to globally-integrated door-to-door personal transport.

SUMMARY OF THE INVENTION

In view of the shortcomings of the prior art and the developing demands for a personalized public transport system, the present invention is proposed. An object of the present invention is to provide a new personal transport system called as "horizontal-running elevator", components used in the system, and control system and control method for controlling the transport system. This transport system can provide door-to-door transport between different buildings.

In this description, the personal transport system according to the present invention is called as "horizontal-running elevator (HRE)", because the system is running in the horizontal-running mode but the environment of the system is similar to that in an elevator which is often closed and opaque without windows.

According to one aspect of the invention, a tube car used in a personal transport system is provided. The said tube car comprises a self-powered car for transporting passengers or goods from door to door, wherein said car is supported or guided by an upper rail and/or a lower rail provided in each tube of a network of tubes used in the personal transport system.

According to another aspect of the invention, a network of tubes used in a personal transport system is provided. The said network of tubes comprises a plurality of tubes, wherein the said network of tubes is combined with the existing blocks or buildings, and each tube in the network of tubes is provided with an upper rail and/or a lower rail for guiding each tube car carrying goods or passengers therein.

According to still another aspect of the invention, a personal transport system called as "horizontal-running elevator" is provided, which comprises cars of the invention and the said network of tubes of the invention, and the said cars run in the network of tubes.

According to still another aspect of the invention, a personal transport system called as "horizontal-running elevator" is provided, which comprises: a tube car comprising a self-powered tube car carrying passengers or goods from door to door; and a network of tubes comprising a plurality of tubes, the said network of tubes combined with the existing blocks or buildings, with each tube in the network of tubes provided with an upper rail and/or a lower rail for supporting and/or guiding the said tube car carrying passengers or goods.

According to still another aspect of the invention, a control system for controlling the personal transport system called as "horizontal-running elevator" of the invention is provided, which comprises a plurality of computers provided in each station, each converging joint of two lines and each tube car, with each computer having its own IP address and communicating other computers via internet, in which: each computer in station is used for collecting and controlling demand information of empty cars in each station and information of available empty cars, and controlling entry/departure operations of cars; each computer at converging joint is used for collecting and managing information related to cars running in the related tubes, and monitoring and controlling the speeds of cars within its management scope to avoid collision of cars; and each computer in each tube car is used for collecting and managing information related to the car running in tubes as well as controlling the running of the car.

According to still another aspect of the invention, a control method for controlling the personal transport system called as "horizontal-running elevator" of the invention is provided, which comprises the following step: during the running of a car, the car-carrying computer frequently detecting whether any changed information of destination station is inputted into the car-carrying computer by a passenger, if "yes", the car-carrying computer communicates with other computers in the network of tubes to change its running course.

As seen from the above, this invention makes it possible to achieve a door-to-door personal transport of persons or goods in horizontal direction between two buildings. In comparison to other traffic systems, the inventive system utilizes tunnel-type tubes to achieve a door-to-door full-automatic transport, and its velocity, line capacity, safety and reliability, ability of resisting disasters and comfortableness are much increased while its consumption of energy, construction cost, occupied space, operating cost, noise and visual pollution are greatly reduced. Furthermore, the transport system of the invention is easy to put into a standardized production, quick to be laid, removed and reused.

BRIEF DESCRIPTION OF DRAWINGS

The above features and other advantages of the present invention will be more clearly understood from the following detailed description of embodiments taken in conjunction with the accompanying drawings, but not limited to the embodiments. In the drawings:

FIGS. 15A and 15B are schematic sectional views of an insert-type guide for rail-changing inserted in the rail;

FIGS. 16A and 16B are schematic views showing the guide for rail-changing of FIGS. 14A and 14B inserted in the rail;

DETAILED DESCRIPTION OF EMBODIMENTS

Specific embodiments of the components of the transport system and their operation according to the present invention will be more clearly understood from the following detailed description taken in conjunction with the accompanying drawings.

Figure 1:
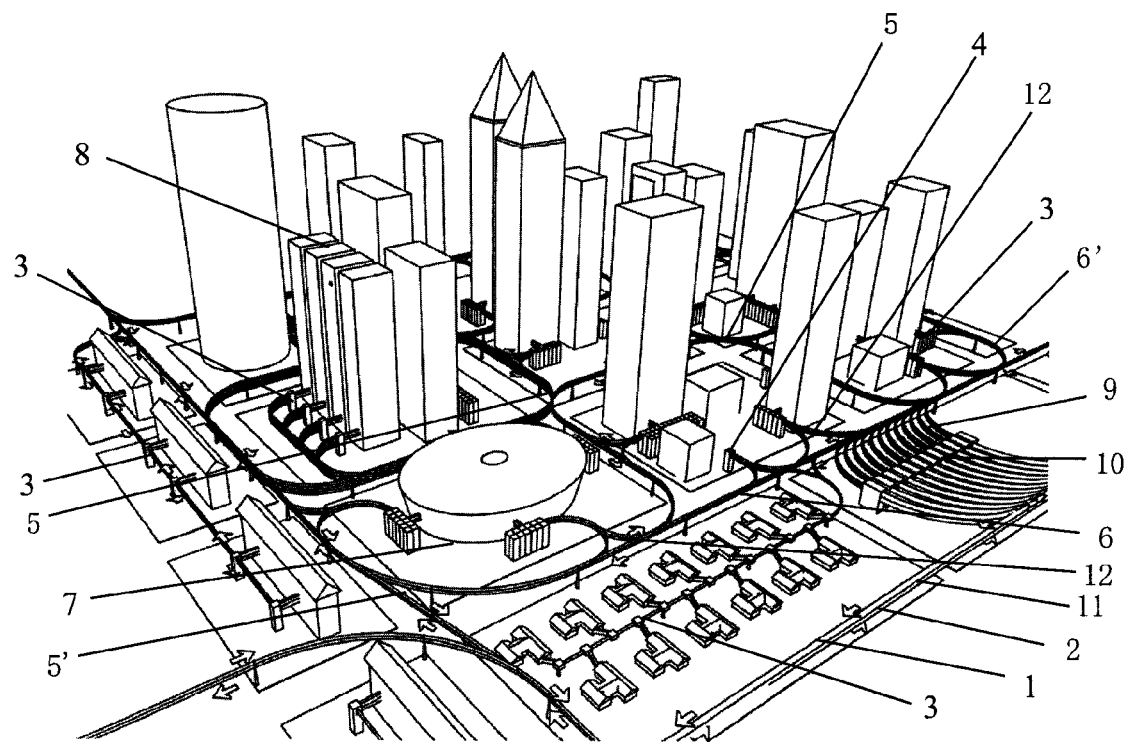
FIG. 1 is a schematic perspective view of a network of tubes according to the present invention, which is combined with the existing urban blocks and buildings.

Referring to FIG. 1, a network 1 of tubes according to an embodiment of the invention includes more tubes 2 combined with the existing blocks or buildings in cities. Upper and/or lower rails are provided in each tube for guiding cars transporting passengers or goods. In this embodiment, the network of tubes may comprise many tubes arrayed in single-layer or multi-layers. Each layer of tubes is loop-typed, in which cars can only run in a single direction. When the network 1 of tubes is designed to include two layers of tubes overlapped, in which each layer is designed to guide cars to travel in a single direction, usually cars traveling in the lower layer tubes 2 move in the opposite direction to cars in the upper layer tubes 2. When the network 1 of tubes is designed to include more than two-layers of tubes, cars in each layer are guided in a single direction, but cars on different layers can travel in the same or opposite direction.

Tube cars (not shown) realize their changeover between upper and lower layer at any medium stations 3, any let-by station, any service station or any line-to-line car storehouse 4 by using vertical lifting means, thereby to realize high density but low area occupation in dense population area.

Each layer of tubes is composed of a plurality of standard straight tubes 6 and curved ones 6', which may be arranged in a space over the existing roads in cities. That is, mounting support poles along roadsides can form X-shape intersection 5 of lines, N-shape intersection 5' of lines, or A-shape intersection of lines or entry/exit loop-lines 12. Each layer of tubes is laid along the existing block 7 in cities and its direction or shape is fitted to the block.

The station 3 may be a part of a 3D car storehouse with one or more moving beams for hanging and circulating cars. It can be directly connected to the existing building 8 with the building 8 not loading the station 3. However, if desired, the building 8 may load the station 3 wholly or partly.

An urban normal-air-pressure low-speed tube 9 is seamlessly jointed to an intercity low-air-pressure high-speed tube 11 by using a pressure transforming stopcock 10. These standard straight tubes and curved tubes are combined into a diverging turnout with one tube connected to two branch tubes or a converging joint with two branch tubes merged into one tube.

At the converging joint, a pair of guide channels of the left tube and a pair of guide channels of the right tube are merged into a pair of guide channels of the converged tube such that the left guide channel in the pair of channels of the left tube guides the car when the car running in the left tube will move into the converged tube, while the right guide channel in the pair of channels of the right tube guides the car when the car running in the right tube will move into the converged tube, and an opening for passing the guide for rail-changing on the car is provided at the converging region.

At the diverging turnout, one tube is connected with two tubes at a diverging turnout of lines, at the said diverging turnout of lines a pair of guide channels of the one tube will be connected to a pair of guide channels of the left tube and a pair of guide channels of the right tube such that the left guide channel in the pair of channels of the left tube guides the car when the car running in the one tube will move into the left tube, while the right guide channel in the pair of channels of the right tube guides the car when the car running in the one tube will move into the right tube, and an opening for passing the guide for rail-changing on the car is provided at the diverging region.

By using a serial of converging joints/diverging turnouts, a tube car can arrive at any point in the network of tubes to the destination station. Before traveling, passengers may reserve the time and stations of the tube car passing each converging joint through the control system of the transport system. That is, a reserved running course will be formed under passengers' preordering operation, specifying the time passing each converging joint and the operation for steering the guide for rail-changing.

Under the control of computers, the car will select a desired direction through the operations of an insert-type guide for rail-changing at the diverging turnout and reach a scheduled destination according to the reserved running course. As long as the information processing speed of the computer system is sufficiently rapid, the passenger is allowed to redefine the reserved running course during the travel, thus enabling the passenger to make a dynamic change of the destination and running course during the travel. The car enters the network of tubes at higher speed, runs along the tubes without any delay and reduces its speed to stop upon reaching the destination. Because such network of tubes doesn't require any cross turnouts or changeover between upper and lower tubes through loops and "dough twist" lines, it is easy to realize the standardized production of line members, thus making construction costs greatly reduced, on-site construction procedures simple and its members reused. Such network of tubes has these advantages like small area occupied and simple appearance, completely suits to the existing blocks and road networks in cities, thus is easy to integrate with the existing buildings, and has better feasibility than all kinds of past personal transport methods and tools.

The speed of tube cars in said network of tubes depend on their traffic flow in tubes: the larger their traffic flow is, the higher their running velocity is, whereas the lower.

In general, the running velocity is in the sequence from high to low: intercity low-air-pressure high-speed tubes, normal-air-pressure low-speed main tubes, normal-air-pressure low-speed branch tubes and normal-air-pressure low-speed branch sub-tubes. The tube cars maintain their travels in the same distance or at the same speed on a certain tube, and increase or reduce their running velocity through curved tube 6' to complete the changes of running velocity between different tubes. The number of pressure transforming stopcock 10 is determined by the traffic flow of cars between an intercity low-air-pressure high-speed tube 11 and a normal-air-pressure low-speed main tube 14: the larger the traffic flow is, the bigger the number of such stopcocks 10 is, whereas the smaller.

Figure 2:
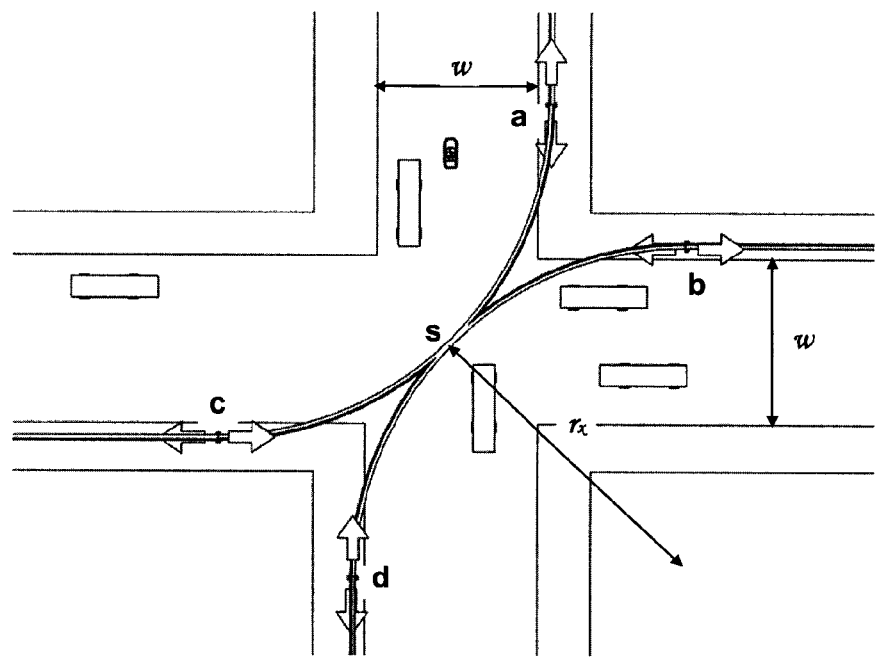
FIG. 2 is a schematic view of X-shape intersection of lines according to the invention.

As shown in FIG. 2, said X-shape intersection of lines is constructed as follows: support poles are set at points a, b, c and d of four entrances and exits, for example on outer sides of the existing roads in cities, curved lines ac and bd are tangent to and connected to point s over the existing roads in cities. The cars on the upper layer can run from point c or point d to point a or point b, and cars on the lower layer can run from point a or point b to point c or point d. Of course, the running direction of cars on the upper layer or lower layer may be set differently.

Figure 3:
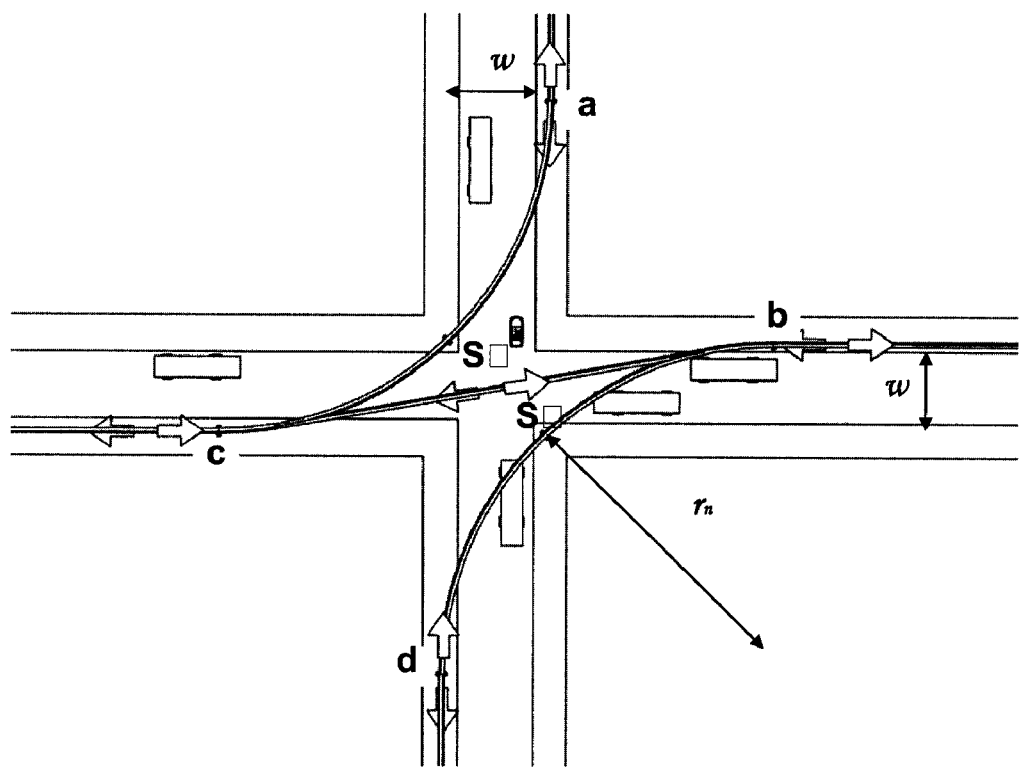
FIG. 3 is a schematic view of N-shape intersection of lines according to the invention.

As shown in FIG. 3, said N-shape intersection of lines is constructed as follows: support poles are set at points a, b, c and d of four entrances and exits, for example on outer sides of the existing roads in cities, and support poles are also set at tangent points s' and s'' of the curved lines ac, bd and corners of the existing roads in cities; points c and b are connected. Cars on the upper layer can run from point c to point a or b, or from point d to point b, and cars on the lower layer can run from point b to point c or d, or from point a to point c.

When the average width of the existing road is w, then
Bending radius of X-shape intersection of lines will be:

$r_x = w/(2-\sqrt{2}) \approx 1.7071w$

In case of occupying the same land area, $r_x$ is equal to 6.87 times of cloverleaf bending radius 0.25w;
Bending radius of N-shape intersection of lines will be:

$r_n = w/(1-\sqrt{2}/2) \approx 3.4142w$

In case of occupying the same land area, $r_n$ is equal to 13.66 times of cloverleaf bending radius 0.25w.

Figure 4:
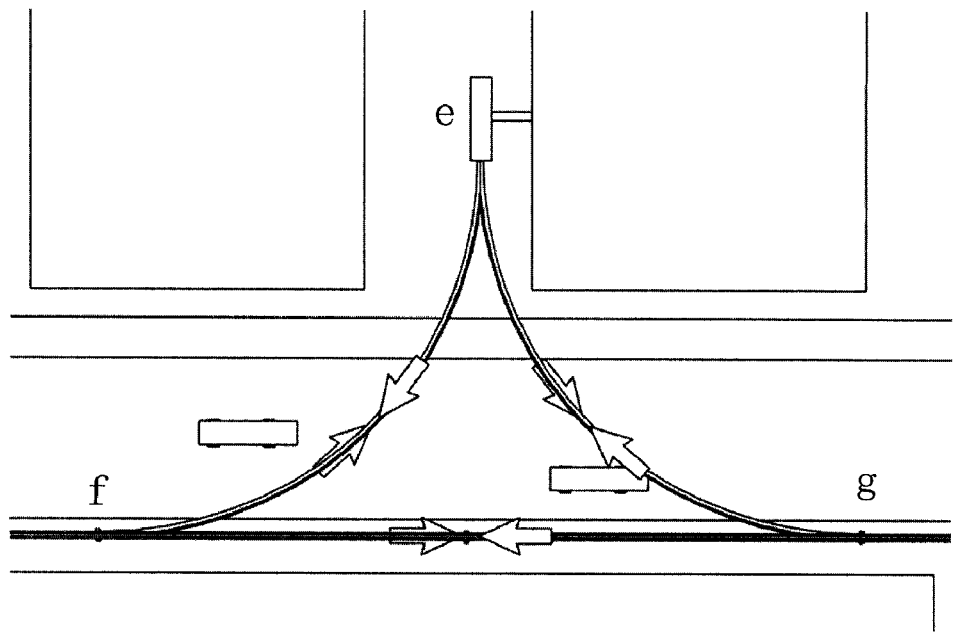
FIG. 4 is a schematic view of A-shape intersection of lines according to the invention.

As shown in FIG. 4, said A-shape intersection of lines is constructed as follows: support poles are set at points b and c of two entrances and exits, for example on outer sides of the existing roads in cities; a station is set at the connection point e of curved lines ef and eg. Cars on the upper layer can run from point g to point e or from point e to point f, and cars on the lower layer can run from point f to point e or from point e to point g. Support poles may be set at point e to connect to a new line and form a line junction.

Under the same operating efficiency of entry/exit stations, the total length of a line can be shortened by over 50% in comparison with a clip-type entry/exit station line, so the land area occupied can be reduced by over 50%.

Now a description will be made with reference to FIG. 5, to clearly explain a tube with an interlayer structure wall and a video/audio transmission means on the outer wall surface as well as a solar cell panel as a power supply means according to the present invention.

Figure 5:
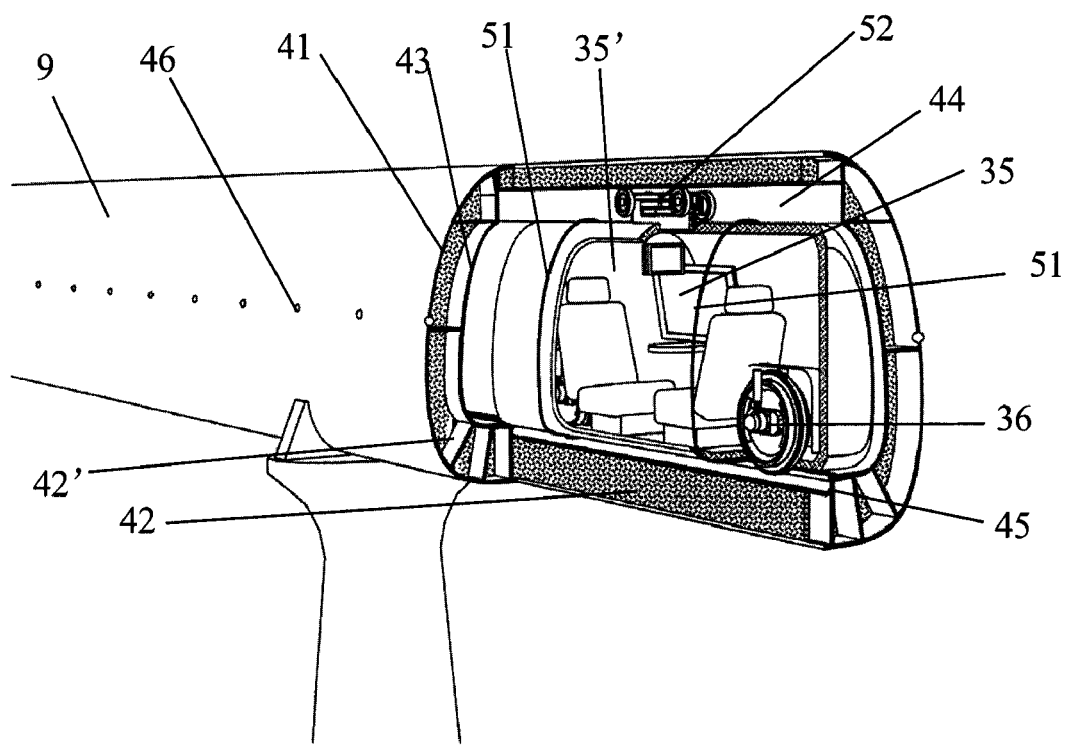
FIG. 5 is a schematic perspective view of a full closed normal-air-pressure low-speed tube with an interlayer structure wall according to the invention.

As shown in FIG. 5, a tube with an interlayer structure wall comprises an outer wall 41, an inner wall 43, a filling layer 42 and a connecting beam 42'. The outer wall 41, the inner wall 43 and the connecting beam 42' are made of super-light composite materials like carbon fiber or glass steel. The filling layer 42 is made of light foam materials like polyurethane. The outer wall 41, the inner wall 43, the connecting beam 42' and the filling layer 42 are closely bonded to form an integrated part and provide stress support to each other. A rail 45 for guiding a tube car 31 is laid on the lower part of the inner wall 43, and a rail 44 for guiding a guide for rail-changing 52 of a car is laid on the upper part of the inner wall 43. The car 31 depends on its self-motility and a driving brake 36 to run on the rails, thus ensuring its uniform acceleration and stability.

Tubes arrayed in each layer may be jointed with reinforced members in T-shape structure, or tubes in two layers can be combined into an integral part, thus further improving their mechanical performance and saving material costs.

The tube with the interlayer structure wall can be used as normal-air-pressure low-speed one and low-air-pressure high-speed one. The foam materials filled in the interlayer structure wall are full of pinholes capable of effectively reducing noises caused by the motion of tube cars in the tube and heat conduction efficiency of wall. Preferably, the section of normal-air-pressure low-speed tube looks like a vertical ellipse or an egg, although any shapes may be applicable if desired. The section of low-air-pressure high-speed tube preferably looks like a circle capable of increasing deflection, compression and torsion resistant performance. Such a tube can be molded at a time on site by adopting the conventional pull-extrude molding process directly through special pull-extrude molding means. It can also be prepared as different sections in a factory, the end of each section is designed to form a coupling structure such as a mortise and tenon joint structure or welding, and then each section is erected, jointed, bonded, twisted and sealed on site, and then completed at a time by filling light foam materials in hollow space in the tube wall. Upon disassembly, the joint bonding agent can be dissolved with solvents, the tube joints can be cut, and new joints can be formed between tubes to reuse tubes.

A video/audio signal transmission means may be provided on the outer wall 41 of a normal-air-pressure low-speed tube. The video/audio signal transmission means may comprises a video/audio signal collection means and a digital information coding and transmitting means. The video/audio signal collection means may comprise a plurality of camera/voice pickup means 46 set on the outer surface of the outer wall 41. The digital information coding and transmitting means may comprise one or more computers, for example information processing computers, network of optical fibers and sending and receiving means of radio signals set in the tubes. Accordingly, another video/audio signal transmission means may be provided in a car, which comprises another digital information coding and transmitting means and a video/audio signal decoding and playing means. The another digital information coding and transmitting means may comprise a sending and receiving means of radio signals, which is set in the car. The video/audio signal decoding and playing means may comprise a playing means set in the car, for example a car-carrying multi-medium device available in market. The video/audio signal transmission means on the outer wall may collect video/audio signal and transmitting the signal to the video/audio signal transmission means in the car, then the signal is decoded by the video/audio signal decoding and playing means and play to passengers in the car.

As shown in FIG. 5, the camera/pickup means 46 is set on the outer wall 41 at certain intervals. Each means 46 has its own position code. Video/audio signals outside the normal-air-pressure low-speed tube are collected by means 46, coded by the information processing computer and played to the tube with the network of optical fibers and the sending and receiving means in the tube. The car 31 running in the tube receives digital video/audio signals with position code of means 46 when passing each means 46, and this signal is decoded by the car-carrying computer of the video/audio signal decoding and playing means in the car, and reverted into views and sounds by the video/audio signal decoding and playing means 35 (e.g. inner car walls and loudspeakers containing display films or large-size liquid crystal screens) to be seen and heard by passengers in the car. When the car 31 is running in the tube, it can receive and play video/audio signals collected in all positions along the network of tubes so that passengers have such feelings that they stay in a real environment with completely transparent tube and completely open sounds in their brains due to retention effects of their visual or auditory nerves.

Figure 6:
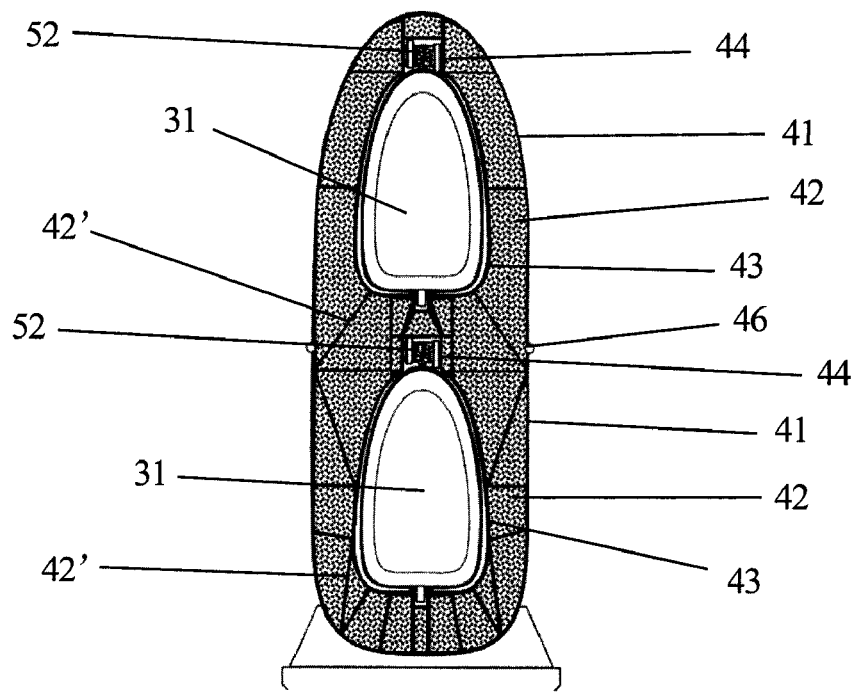
FIG. 6 is schematic sectional view showing a double-layered integration design of two closed normal-air-pressure low-speed tubes with interlayer structure wall.

As shown in FIG. 6, a double-layered tube having two tubes with interlayer wall are overlapped and forming an integral part consisting of the outer wall 41, the inner wall 43, the filling layer 42 and the connecting beam 42', making the vertical bending resistance of the whole tube stronger and further increasing the erection span under the same conditions and more fitting to the layout of the existing blocks and buildings in cities. Cars 31 on upper and lower layers run on their respective tube in opposite directions. Herein cars 31 share the same set of means 46 and the digital information coding and transmitting means (not shown).

Figure 7:
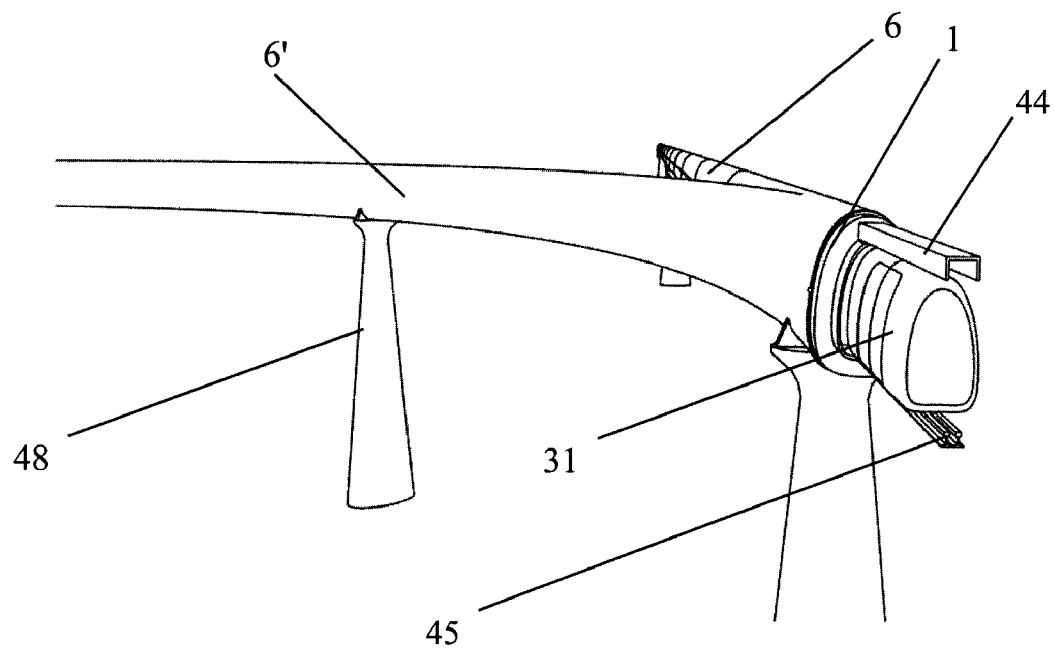
FIG. 7 to FIG. 8 are schematic perspective views of single-layered and multi-layered full closed normal-air-pressure low-speed tubes with interlayer structure wall.

As shown in FIG. 7, a tube with interlayer structure wall is supported by support poles 48 to firmly joint a standard straight tube 6 and a standard curved tube 6', thus ensuring that a car 31 can run on the joint region between rail 44 in the tube and rail 45 for support.

Figure 8:
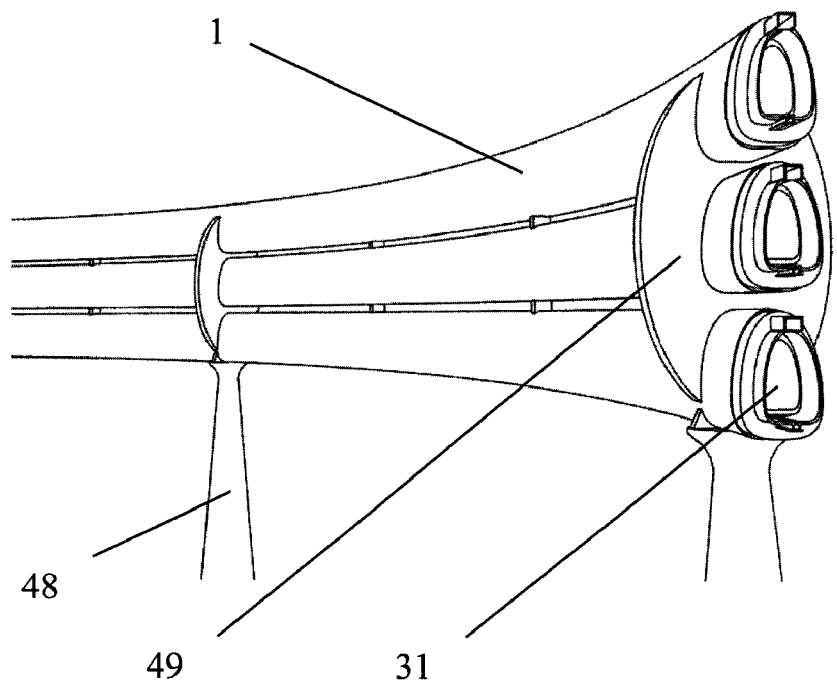

As shown in FIG. 8, a multi-layered tube with interlayer structure wall is jointed with a reinforced junction plate 49 and firmly connected to a support pole 48 to form a flexible structure capable of seismic resistance, wind prevention, seaquake prevention, flood prevention and mudflow prevention, etc.

Figure 9:
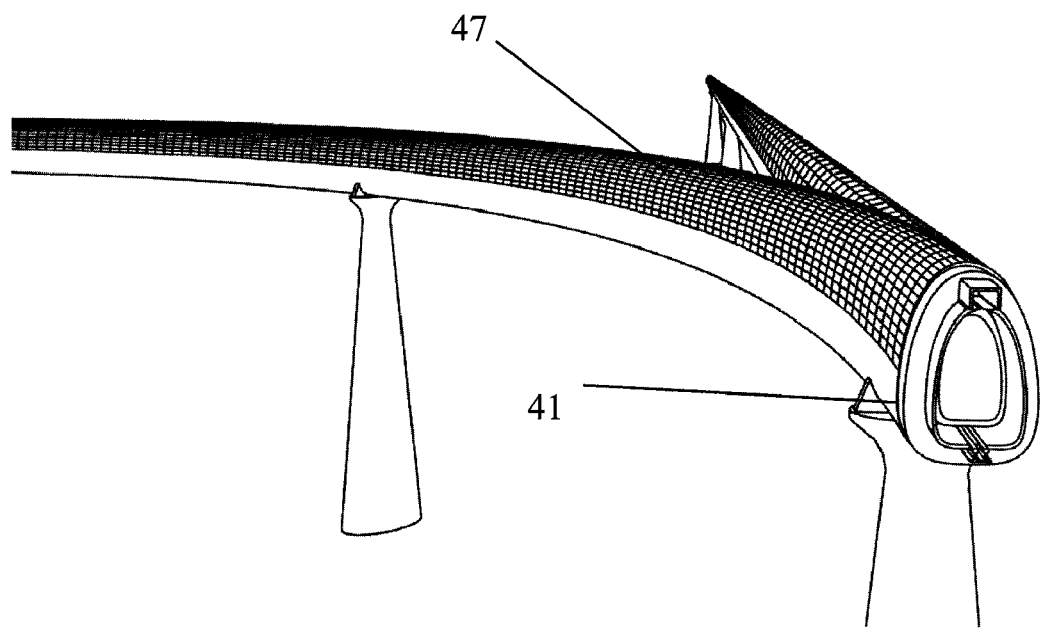
FIG. 9 is a schematic perspective view of a wall-type solar cell panel.

Next a solar cell panel mounted on the outer wall of tubes will be described with reference to FIG. 9. The solar cell panel is provided to supply power for the horizontal-running transport system independently and comprises a solar cell panel, a power storage means and a power transmission means. As shown in FIG. 9, the solar cell panel 47 is laid on the outer surface of the outer wall 41 to collect solar energy and convert the solar (optical) energy into electric energy. The power storage means may be arranged at any positions, for example between the out wall 41 and the inner wall 43 or any other suitable positions to store electric energy and ensure that the whole transport system is powered stably by the solar cell panel 47 in case of no solar energy. The power transmission means may be laid along the tubes, including power transmission lines, transformers and charging means, and it can charge on-board accumulator of a tube car in all its stations. In this way, the solar power supplies make the whole transport system capable of using the reproducible clean energy completely independent of any external systems.

Of course, the solar power supply can be replaced with any other power supply means in the field, for example, electric energy or heat energy from fuels used in the prior art.

The following description with reference to FIG. 10-FIG. 15 is related to the tube cars running in the normal-air-pressure low-speed tube according to the invention, which can produce piston effect. Each cars has an insert-type guide for rail-changing.

Figure 10:
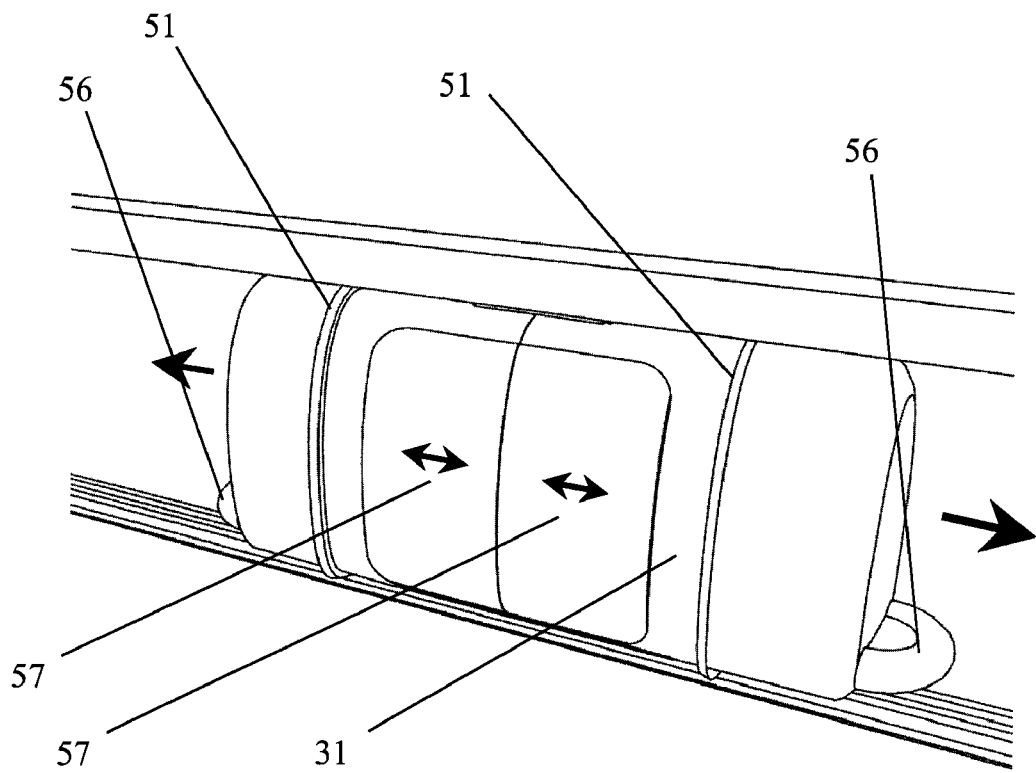
FIG. 10 is a schematic perspective view of an electric tube car capable of producing piston effects.

As shown in FIG. 10, the electric tube car 31 can be driven by a driveing/loading wheel powered by a self-carried motor (not shown) to run forward or backward on the rail. Its shell section is similar to the inner section of the normal-air-pressure low-speed tube in which the car 31 is running. An airtight ring 51 is fixed along the cross-section of the peripheral surface of the car shell. So running environment is safe and running speed and car density may be improved. A shock absorbing chassis 56 is fixed at front and rear ends of the chassis of the car 31, respectively. When the distance between two adjacent cars 31 in the normal-air-pressure low-speed tube is rapidly reduced, the air pressure between these two cars 31 is suddenly increased to make the airtight ring 51 cover the slit between the cars 31 and the inner wall 43 of the normal-air-pressure low-speed tube. In this case, these two cars function as pistons in the normal-air-pressure low-speed tube, the air incapable of rapid leakage between these two cars forms "air spring" to reduce the impact force of rapid collisions produced when traffic accidents (rear-end or converging) occur, thus ensuring cars running safely. When these two cars are likely to collide with each other due to the combination of two normal-air-pressure low-speed tubes into one normal-air-pressure low-speed one, the air between these two cars is firstly compressed and can't leak due to the blockage of the airtight ring 51. That is, the airtight ring 51 results in "piston effect". This further results in air expansive force to drive these two cars moving in opposite directions and rapid reduction of their collision speed. When these two cars 31 approach each other at low speeds, their collision impact force is further reduced by a shock absorbing means (shockproof & shock absorbing chassis 56), separately endured by the rigid chassis of said cars, and passed to the normal-air-pressure low-speed tube with loading wheels of these cars. Meanwhile, many tube cars can run in a single direction on the normal-air-pressure low-speed tube due to the driving force of said cars capable of producing piston effect in order to produce a sequential air flow in the same traveling direction in said tube. The said air flow runs with the cars traveling in the same direction and effectively reduce the facing air resistance blocking the cars. So the air flow helps to increase the running speed of cars up to 180 km/Hr while reducing the assumption of energy. Furthermore, the air flow can form an air conditioning circulation in the normal-air-pressure low-speed tubes and cars effectively so as to set air conditioning means in a position of the tubes.

In addition, the air flow can make the cars in the tube have a trend to run in substantially equal speed. In this case, even if one or a few cars are not self-driven due to faults, they will run forward under the driving force of the air flow to let-by stations or service stations. This can avoid to stop the whole system.

Moreover, air release valves and air suction valves may be arranged along the tubes at suitable positions by using the conventional jet of fluids technology. By means of the air release valves and air suction valves, the air flow in the closed tube may be adjusted to further adjust the running speeds and positions of cars therein. The valves may be mechanically controlled. Even if the computer systems in the tubes malfunction, the cars can run safely.

Figure 11:
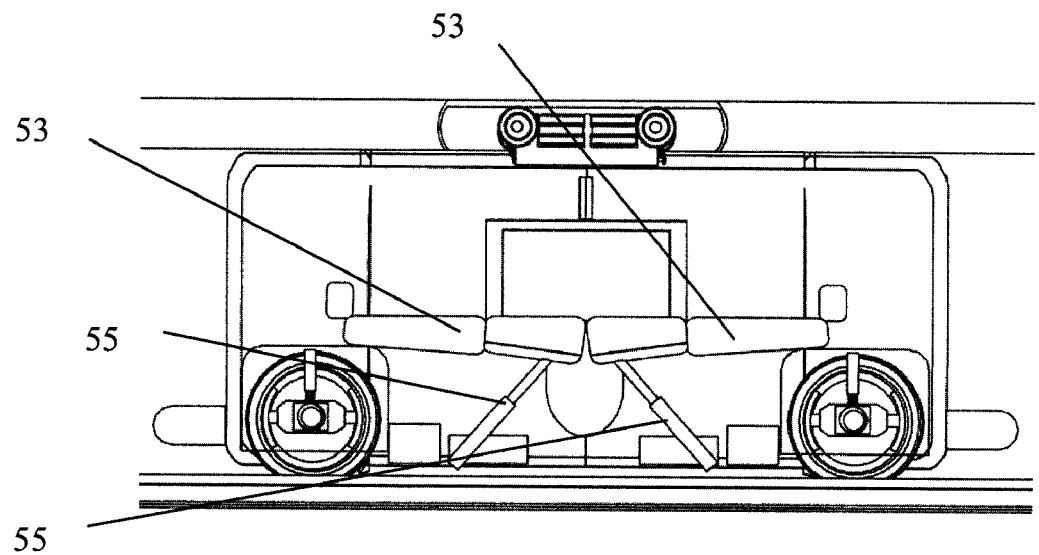
FIG. 11 is a schematic perspective view of internal structure of a tube car.

As shown in FIG. 11, one to two seats 53 are disposed in the tube car 31 according to the invention. The car is preferably opaque without any windows. The door of the car is opened or closed by sliding towards left and right sides or the center. A water-free processing system for processing dejecta can be set under seat 53. The seat 53 can be automatically stretched into a couchette through an electric mechanical means 55. Preferably, the number of passengers in each car should be small enough to meet the personal demands of passengers and reduce the empty load factor. In order to increase the practical value of the whole system, be sure to increase the departure density and running speed of cars. In this case, it is necessary to specially design a guide for rail-changing for diverging turnout and anti-collision switch for converging joint for the high-speed high-density running.

Figure 12:
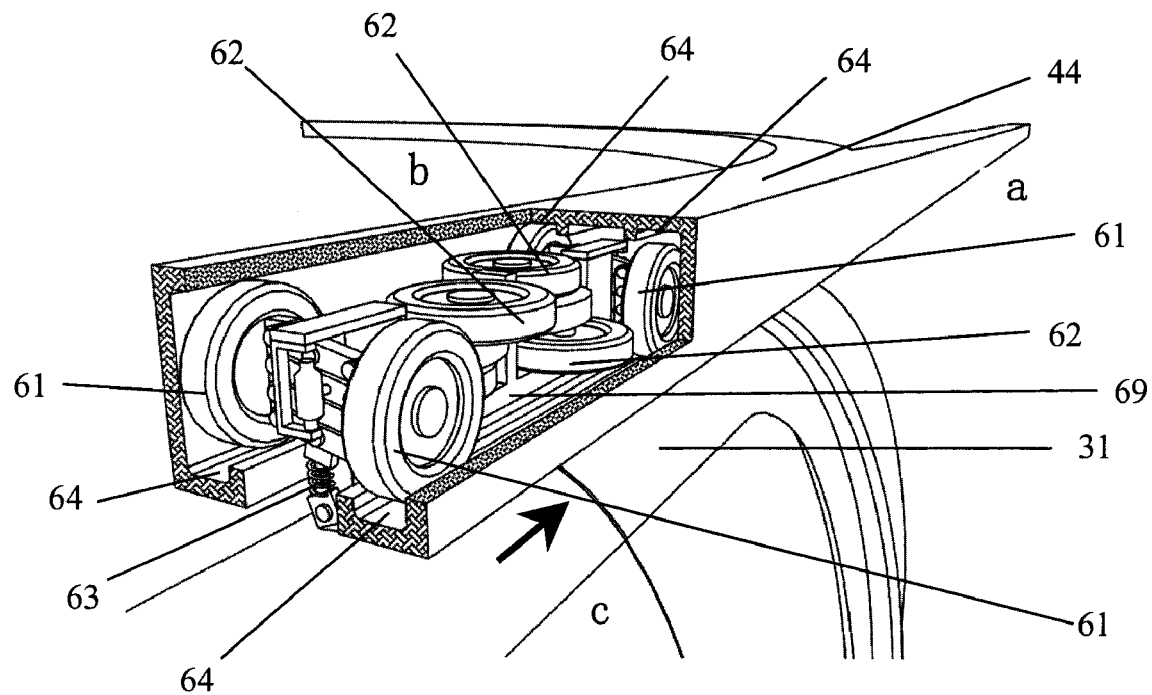
FIG. 12 is a schematic cut-away perspective view of an insert-type guide for rail-changing inserted in the rail.

According to an embodiment of the invention, an insert-type guide for rail changing may be installed on the tube cars to achieve the switch of right and left lines when passing diverging turnouts. As shown in FIG. 12, the insert-type guide for rail-changing is an electromechanical means capable of making the car switch lines rapidly during the travel. This electromechanical means comprises a vertical wheel assembly 61, a horizontal wheel assembly 62, an imbalance switch unit 63, a junction plate 69 and three pairs of guide channels 64 of rails in three tubes respectively at a diverging turnout. The vertical wheel assembly 61 is fixed at front or rear region of the horizontal wheel assembly 62 and controlled by the imbalance switch unit 63. The left-side wheel 61' and the right-side wheel 61" of the vertical wheel assembly can move upwards and downwards in parallel alternately to insert in the left-side channel 64 or the right-side channel 64' of the rail 44 in each tube. Under the restriction and guide of guiding channels, the vertical wheel assembly 61 can drive the guide 52 for rail-changing and the car 31 forward from point c to point a along the straight line or point b along the curved line. The horizontal wheel assembly 62 fixed between a front and a rear vertical wheel assemblies lean against both side walls of the rail 44 and provide left and right balancing forces for the car 31. Herein, the horizontal wheel assembly 62 may be replaced with other assembly such as magnet assembly or clutching and releasing means.

Figure 13:
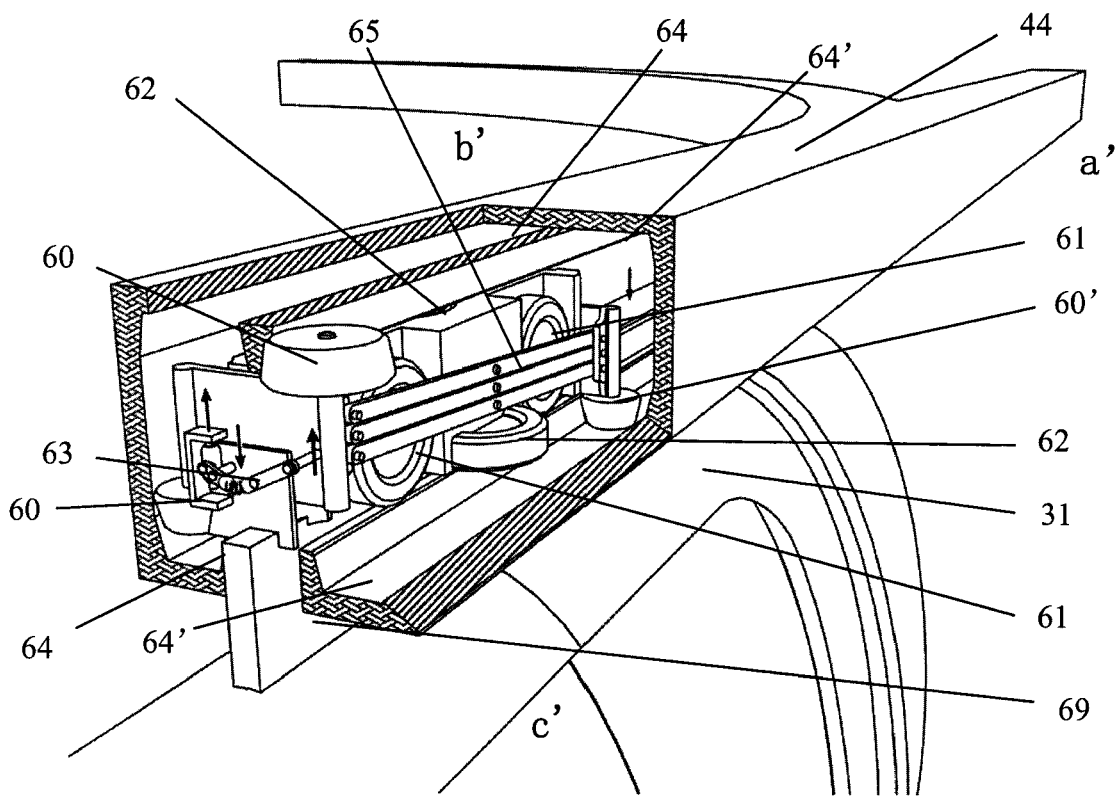
FIG. 13 is a schematic cut-away perspective view of an improved insert-type guide for rail-changing inserted in the rail.

According to another embodiment of the invention, as shown in FIG. 13, the insert-type guide for rail changing may be modified as follows: comprising a rear insert wheel assembly 60 and a front insert wheel assembly 60', a vertical wheel assembly 61, a horizontal wheel assembly 62, the imbalance switch unit 63, an electro magnet 63', a junction plate 69 and three pairs of guide channels 64 of three rails 44 in three tubes respectively at the diverging turnout. Insert wheel assemblies 60 and 60' are fixed at front and rear portions of the insert-type guide for rail-changing, and jointed by an interlinking lever 65 and the imbalance switch unit 63. When the electro magnet 63' moves upwards and downwards due to the pull force from an armature, the rear insert wheel assembly 60 and the front insert wheel assembly 60' will move upwards or downwards in parallel alternately by means of the interlinking lever 65.

Figure 14:
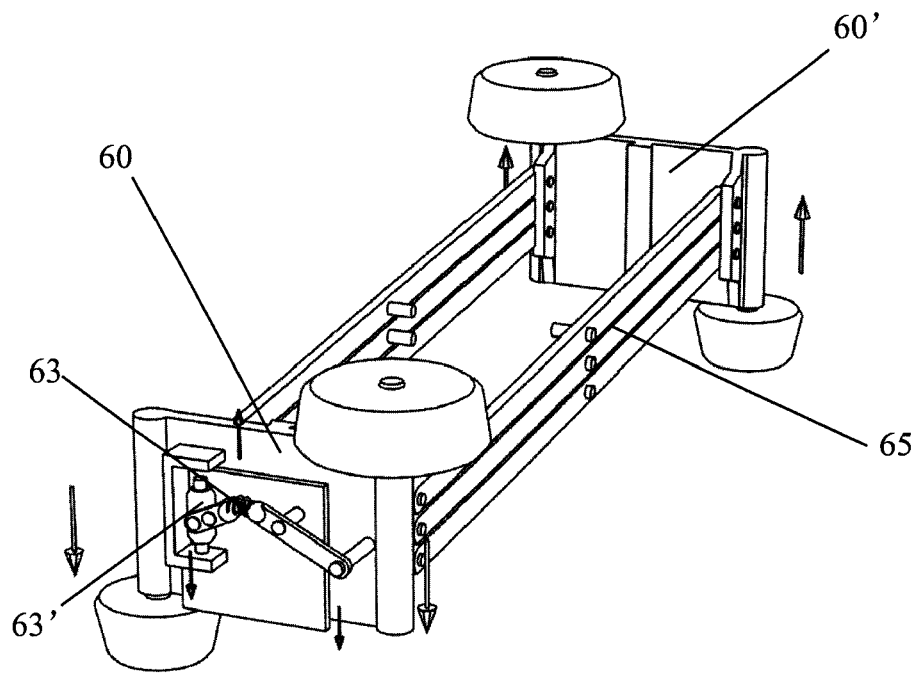
FIG. 14 is a schematic perspective view of another insert-type guide for rail-changing.

As shown in FIGS. 14 to 16, the rear insert wheel assembly 60 and the front insert wheel assembly 60' can move upwards or downwards. When The rear insert wheel assembly 60 moves downwards while the front insert wheel assembly 60' moves upwards, the wheels of the front and rear insert wheel assemblies insert in the left guide channel 64 of the rail while depart from the right guide channel 64'. As a result, the guide for rail-changing leads the car 31 forward from point i to point A under the guide of the left guide channel 64. In a similar way, when the rear insert wheel assembly 60 moves upwards while the front insert wheel assembly 60' moves downwards, the guide for rail-changing leads the car 31 forward from point j to point B. The imbalance switch unit 63 comprises an electromagnet 63' and a spring between the two sub-interlinking levers of the said interlinking lever. The two interlinking levers are out of balance due to a force from the spring and thus they must locate in the upper or the lower stable position so as to make the insert wheel assemblies not in the middle due to any failure of magnets and avoid the risks caused by the insert wheel assemblies located between the guide channels 64 and 64' of the rail.

The vertical wheel assembly 61 arranged on the upper edge of the junction plate 69 presses against the inner edge of the rail 44 and transmits the driving force to the car 31 for vertical motions thereof. In the meanwhile, the vertical wheel assembly 61 also transmits the driving force to the car 31 for its horizontal motion in the station under the drive of a motor for the horizontal motion of the car. The horizontal wheel assembly 62 arranged on the upper edge of the junction plate 69 presses against the both side walls of the rail 44 and provides left and right balancing forces for the motions of the car 31.

As can seen from the above, such a guide for rail-changing is simple in structure, rapid in response, reliable in performance, high in durability, low in construction costs and capable of overcoming effectively centrifugal force produced when tube cars turn to ensure the stability of the cars running at a high speed.

Figure 17:
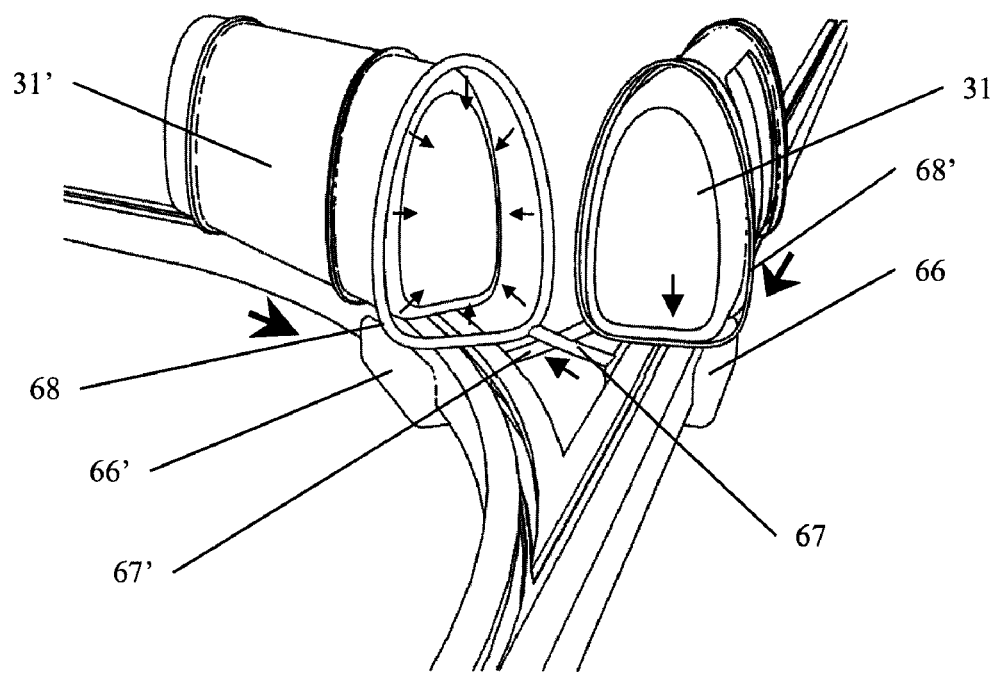
FIG. 17 is a schematic perspective view of an anti-collision switch on lines' converging portion.

According to the present invention, a converging joint anti-collision switch unit is preferably set in each converging joint of lines. Such a converging joint anti-collision switch unit may be of mechanical structure comprising one or more pressure application means, one or more pressure transmission means and damping means, and can be disposed near diverging rails of the converging joint. An embodiment of the anti-collision is shown in FIG. 17. As shown in FIG. 17, the anti-collision switch unit comprises two pressure application means 66 and 66' and two expansion rings 68 and 68', which are connected to two hydraulic (or pneumatic) tubes 67 and 67'. These hydraulic (pneumatic) tubes 67 and 67' are full of pressure transmission liquid (or air). Said pressure application means 66 and 66' are fixed under the entrances on both sides of a converging joint, said expansion rings 68 and 68' are laid on inner walls of the tubes and fit to outer walls of the cars 31 and 31'. When the car 31 firstly reaches, for example, the right tube, the gravity of this car 31 applies pressure to the pressure application means 66 on the right tube. Such a pressure passes to the expansion ring 68 on the left tube to make the ring 68 expanded via the pressure transmission liquid (or air) in the hydraulic (or pneumatic) tube 67, and forms a blocking air space with the airtight ring 51 of the car 31' on the left tube to reduce the forward-running speed of the car 31' due to the counterforce of compressed air in this air space. After the car 31 has passed said pressure application means 66 completely, the pressure in the hydraulic (or pneumatic) tube 67 is released and the car 31' returns to its original forward-running speed. At this time the car 31 has passed this converging joint and thus the collision is avoided when these two cars reach the converging joint from the right tube and the left tube at the same time respectively. When the gravity of the car 31 applies a pressure to the pressure application means 66, this pressure makes a relief valve (not shown) of the pressure application means 66' opened and thus the car 31' cannot apply a pressure to the pressure application means 66' so as to ensure that the forward-running speed of the car 31 is not influenced.

Similarly, if the car 31' in the left tube firstly arrives, its gravity makes the forward-running speed of the car 31 on the right tube reduced and avoids the collision produced when these two cars 31 and 31' reach the converging joint at the same time.

Now the description with reference to FIGS. 18 to 19 will be made, which is related to the pressure transforming stopcocks for seamlessly jointing a low-air-pressure high-speed tube and a normal-air-pressure low-speed tube, as well as the low-air-pressure high-speed tube for running a tube car by using the floating "overshoe" means.

Figure 18:
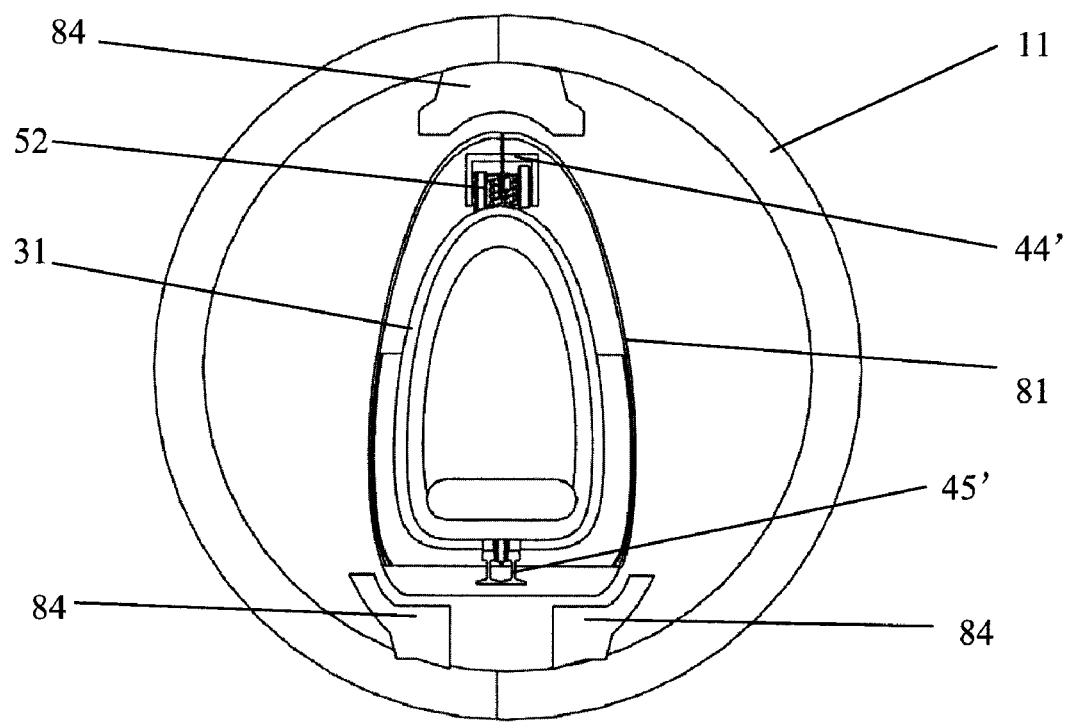
FIG. 18 is a schematic sectional view of an air-floating "overshoe" means in a low-air-pressure super-light high-speed tube.
Figure 19:
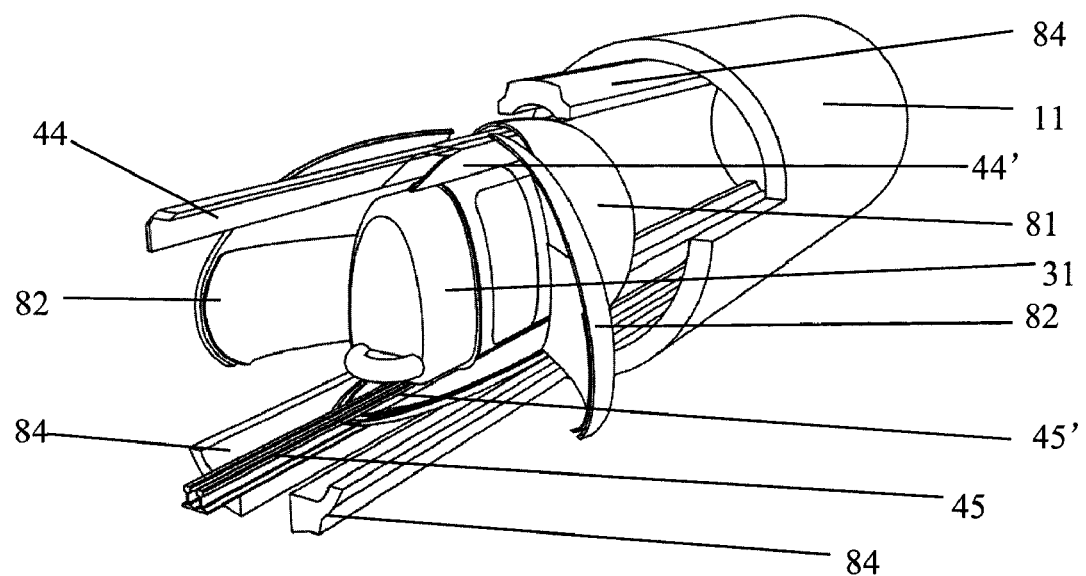
FIG. 19 is a schematic view showing internal structure of the air-floating "overshoe" means in the low-air-pressure super-light high-speed tube.

As shown in FIGS. 18 to 19, the car 31 can be loaded in a floating "overshoe" means 81 which can run in the low-air-pressure super-light high-speed tube 11 at a high speed. The maximum cross section of the floating overshoe means 81 is less than 30%-60%, preferably 40% of the headroom in the tube 11 and the air pressure in the tube 11 is preferably very low, for example less than 0.1 air pressure. The floating "overshoe" means 81 is designed as a "overshoe" comprising a floating power tray, a overshoe door 82 and an aerodynamic shroud for regulating air flow. The floating overshoe means 81 has a control means inside it. Rails 44' and 45' are laid on the floating power tray and they are connected to rails 44 and 45 in a normal-air-pressure low-speed tube respectively. In this way, the electric tube car 31 can run into the "overshoe" means 81 along rails 44 and 45, and is combined with the "overshoe" means 81 into an integral part. This floating "overshoe" means 81 is controlled by the control means inside it and runs with the car 31 in the low-air-pressure super-light high-speed tube 11.

Said low-air-pressure high-speed tube may be an evacuated high-speed tube.

Figure 20:
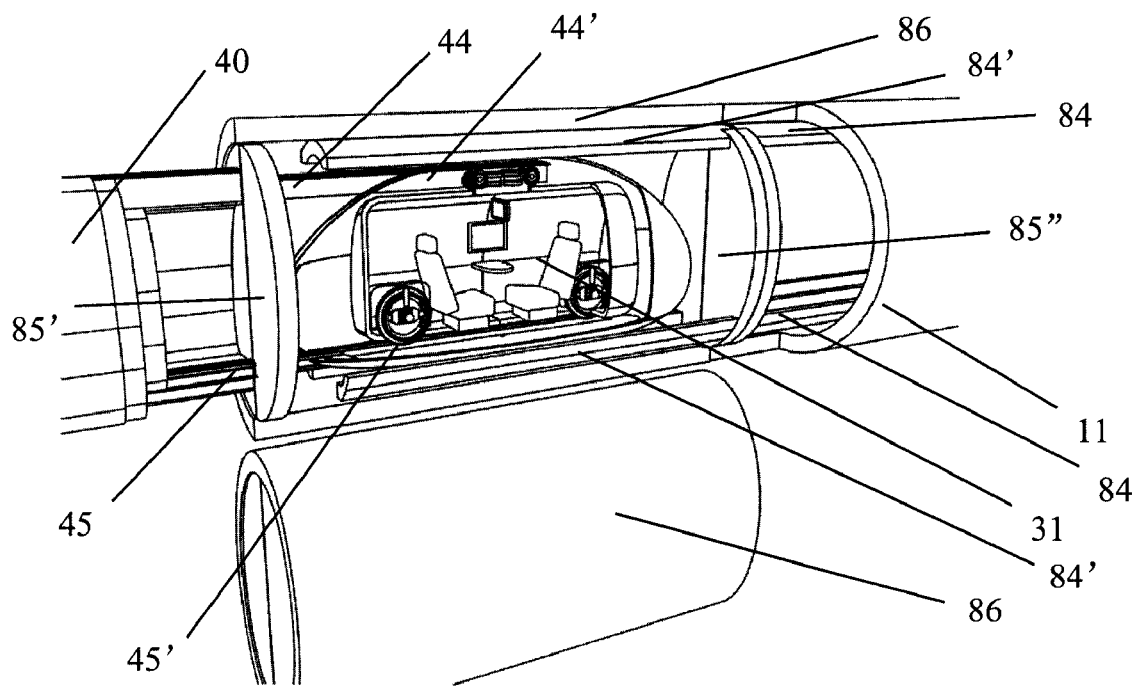
FIG. 20 is a schematic view showing the structure of a pressure-transforming stopcock used for seamlessly jointing a normal-air-pressure low-speed tube and a low-air-pressure high-speed tube.

As shown in FIG. 20, a pressure transforming stopcock 10 for seamlessly jointing a normal-air-pressure low-speed tube 9 and a low-air-pressure high-speed tube 11 includes a few airtight cabins 86 each for containing one floating "overshoe" means 81, with each airtight cabin 86 having a set of air pressure reducing/boosting means (not shown) and having airtight doors 85' and 85" on its both ends. All these airtight cabins 86 are linked with a chain circulating means (not shown) and circulate around the chain to make said floating "overshoe" means enter or leave out of airtight cabins 86. Rails 44' and 45' are arranged in the floating "overshoe" means to make the cars move horizontally in such floating "overshoe" means. These rails 44' and 45' are in line with and suit rails 44 and 45 in the normal-air-pressure low-speed tube so as to make cars 31 enter or leave out of the floating "overshoe" means. Each airtight cabin 86 is provided with a rail 84' to make the floating "overshoe" means move horizontally inside it. The said rail 84' is in line with and suit a rail 84 set in the low-air-pressure high-speed tube 11 to make the floating "overshoe" means enter or leave out of the airtight cabin 86. The pressure-transforming stopcock 10 is provided between the normal-air-pressure low-speed tube and the low-air-pressure high-speed tube. The car 31 can run from the normal-air-pressure low-speed tube into the low-air-pressure high-speed tube automatically through this pressure-transforming stopcock 10. Its running process is as follows: when the first airtight door 85' opens, the car 31 will run from the normal-air-pressure low-speed tube 9 to the floating "overshoe" means in the airtight cabin 86; when said airtight door 85' closes, the air pressure reducing/boosting means (not shown) in the airtight cabin 86 will reduce the air pressure of said cabin; when the air pressure in the airtight cabin 86 is equal to that in the low-air-pressure high-speed tube 11, the second airtight door 85" will open and the car 31 together with the floating "overshoe" means will automatically run from the airtight cabin 86 to the low-air-pressure high-speed tube 11. To the contrary, the car 31 can also run from the low-air-pressure tube 11 to the normal-air-pressure low-speed tube through the airtight cabin 86.

It should be understood that the floating mode is an example of the running mode of a tube car or a "overshoe" means. Said car or "overshoe" means can run in the tubes in magnetic floating or roller mode.

For storing the cars according to the invention, a three-dimensional (3D) car storehouse with one or more stations is specially designed. Please refer to the following description of the 3D car storehouse with reference to FIGS. 21 and 22.

Figure 21:
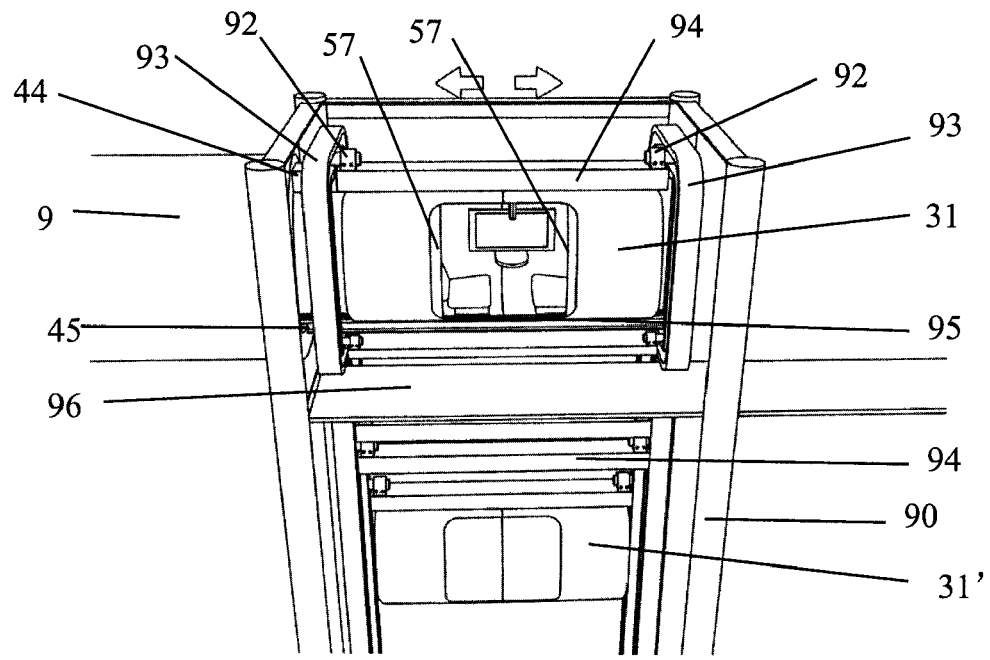
FIG. 21 is a schematic view showing the structure and principle of a three-dimensional (3D) car storehouse, with one or more moving beams for hanging and moving cars in the storehouse.
Figure 22:
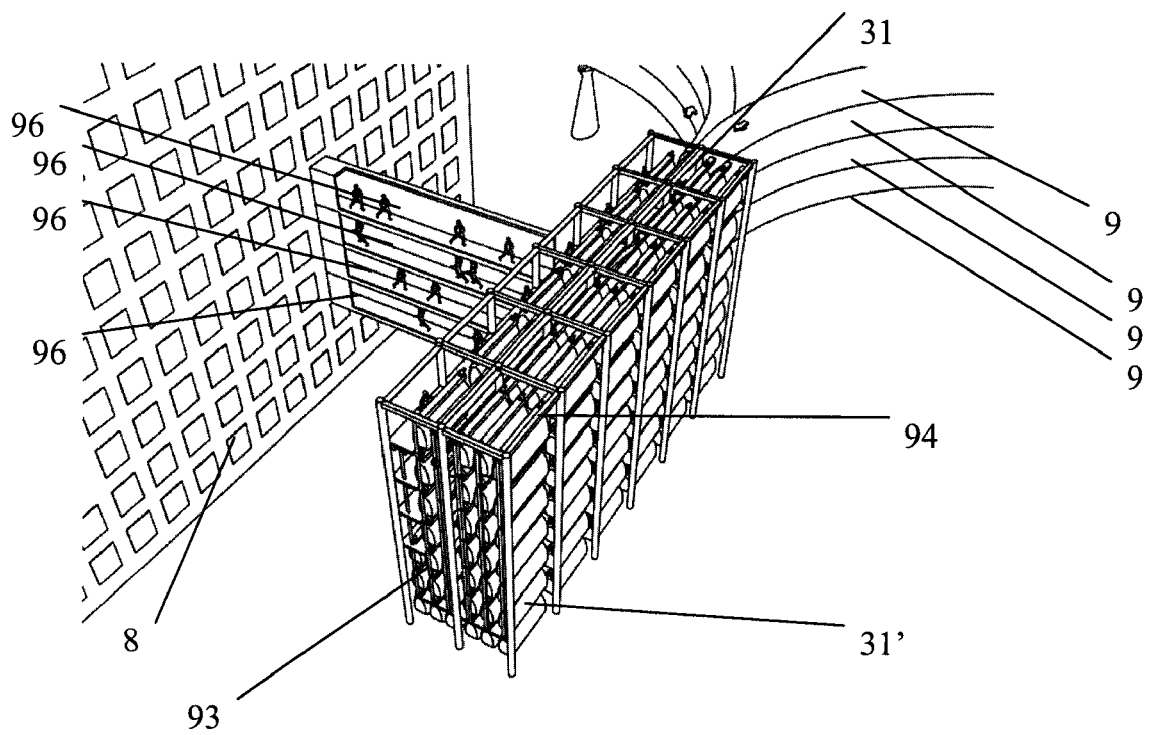
FIG. 22 is a schematic layout of a 3D car storehouse with one or more moving beams for hanging and moving cars, which may be applied in off-line multi-floor stations.
Figure 23:
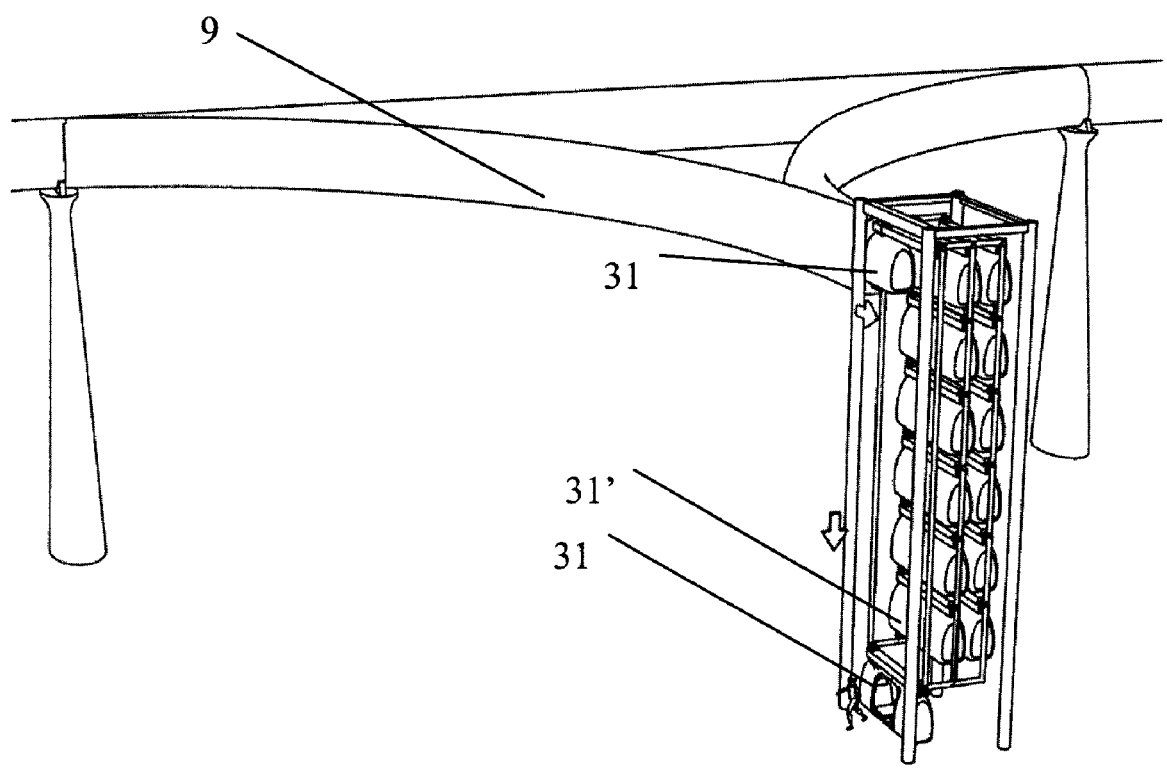
FIG. 23 is a schematic layout of a 3D car storehouse with one or more moving beams for hanging and moving cars, which may be applied in let-by stations, service stations and line-to-line car storehouses.

As shown in FIGS. 21 to 22, said 3D car storehouse includes one or more stations and is composed of a plurality of unit modules built as block-type, with one or more moving beams for hanging and moving cars to meet the demands for the horizontal-running elevators. In particular, in the 3D storehouse, there are an entry/exit line 9, one or more entry/exit station, at least one storehouse of cars, a vertical circulating rail 93, a horizontal hanging beam 94 for hanging and moving cars, a driving mechanism 92, a platform backing plate 95, a walking bridge 96 and a station control computer (not shown). After the walking bridge 96 jointed to and supported by the station of the car storehouse is connected with a door/doors or a window/windows of the existing building 8 but not loaded by the building 8, passengers can enter or leave out of the station of the storehouse directly through the walking bridge 96 from or to the building. The car 31 can move upwards or downwards, left or right, forward or backward along the vertical circulating rail 93 under the drive of the driving mechanism 91 and the action of the horizontal hanging beam 94. In this way, the control of empty cars is automatically done by computers according to actual demands so as to be used for the whole transport system.

A tube car carrying passengers is received and stored in said 3D storehouse according to the following operations:
(1) The car 31 enters on the entry/exit line 9 and runs under the horizontal hanging beam 94;
(2) Driven by the driving mechanism 92, the car 31 is moved onto the backing plate 95 so that the station entry/exit line 9 is emptied to let other tube cars run normally on the line 9 without blocking;
(3) After leaving the tube car 31, the passengers go into the building 8 along the walking bridge 96, and then the backing plate 95 turns down in order to provide a passage for the empty tube car to move down;
(4) Jointly driven by the horizontal hanging beam 94 and the driving mechanism 92, the empty tube car 31 moves down into the 3D car storehouse;
(5) The empty horizontal hanging beam 94 and the driving mechanism 92 move into the station entry/exit line 9 along the vertical circulating rail 93 and are located in line with the rail 44, 45 in order to receive next car into the station.

To the contrary, tube cars can be supplied and sent continuously by following the reverse operation of the above (1)-(5).

According to the environmental space and demands for use, the entry/exit station can be set on any floor/floors of the 3D car storehouse. The said 3D car storehouse can be built into a lot of types such as single-column type, wall-type, embracing-type, cloister-type, lifting-cabin type, floor-type, household-type or building-type; the 3D car storehouse can be set as one or more layers. The 3D storehouse can also be set on line or off line. When set off line, it can use the said "A"-shape intersection of lines. The off-line multi-layered floor-type 3D storehouse can receive the maximum instant passenger/good flow of 20 cars/times per second.

The said 3D car storehouse can be built as let-by station, service station or line-to-line car storehouse, so that it can be used for temporarily stopping, lowering or service of particular cars in case of any faults during the operation, and provide enough standby empty cars for the lines with high traffic flow.

The following is a detailed description of a control system and a control method of the personal transport system according to the invention.

The control system of the transport system may be a centralized system facing interconnection or an internet distributing system facing no interconnection, or the combination thereof. According to an embodiment of the invention, there is provided a distributing system comprising a number of computers provided in each station, each converging joint of lines and each car, with each computer having its own IP address, each car having its own ID information, and communicating other computers via internet as follows:
1) A computer in station is used for collecting and controlling information about required and stored empty cars to balance them; in the meanwhile for controlling the operations in the station such as cars entering or leaving out of the station and passengers' boarding or leaving cars.
2) A computer at the converging joint of two lines is used for collecting and managing information related to running of cars in the related tubes, and in the meanwhile for monitoring and controlling speeds of cars in the related tubes so as to avoid any collision of cars.
3) A computer in a tube car is used for collecting and managing information related to running the car, and in the meanwhile for controlling the running of the car.

To detect whether a car is approaching the converging joint of lines, a plurality of detecting means for detecting the real arriving time of the car are arranged along tubes in the network of tubes. Each detecting means is connected to the computer in the related converging joint. Therefore, any detected signals from the detecting means will be transferred to the computer in the related converging joint. The computer in the converging joint calculates the difference between the real arriving time and the pre-ordered arriving time. When the difference exists, the computer in the converging joint will inform the computer in the car. Then, the computer in the car will modify the speed of the car so that the car arrives the converging joint on time. Herein the detecting means may be any suitable sensor for detecting the arriving time of the car, for example, a pressure sensor, a radio sending and receiving means set in the car and the detecting means respectively and so or.

According to an embodiment of the invention, a control method for controlling the transport system is used to determine a suitable course, change the pre-ordered destination and obtain the statistic data related to the transport system.

The obvious difference between the control method of this invention and existing technologies is as follows: the control method of the invention adopts distributing management ideas, that is, it does not specify the detailed running course of a car between the starting place and the destination but provides possible running courses. Then the car will select an appropriate running course independently during the travel according to actual line conditions. In a word, such a control method is dynamic and similar to transmission modes of IP packages in TCP/IP protocol which does not face connections.

Figure 24:
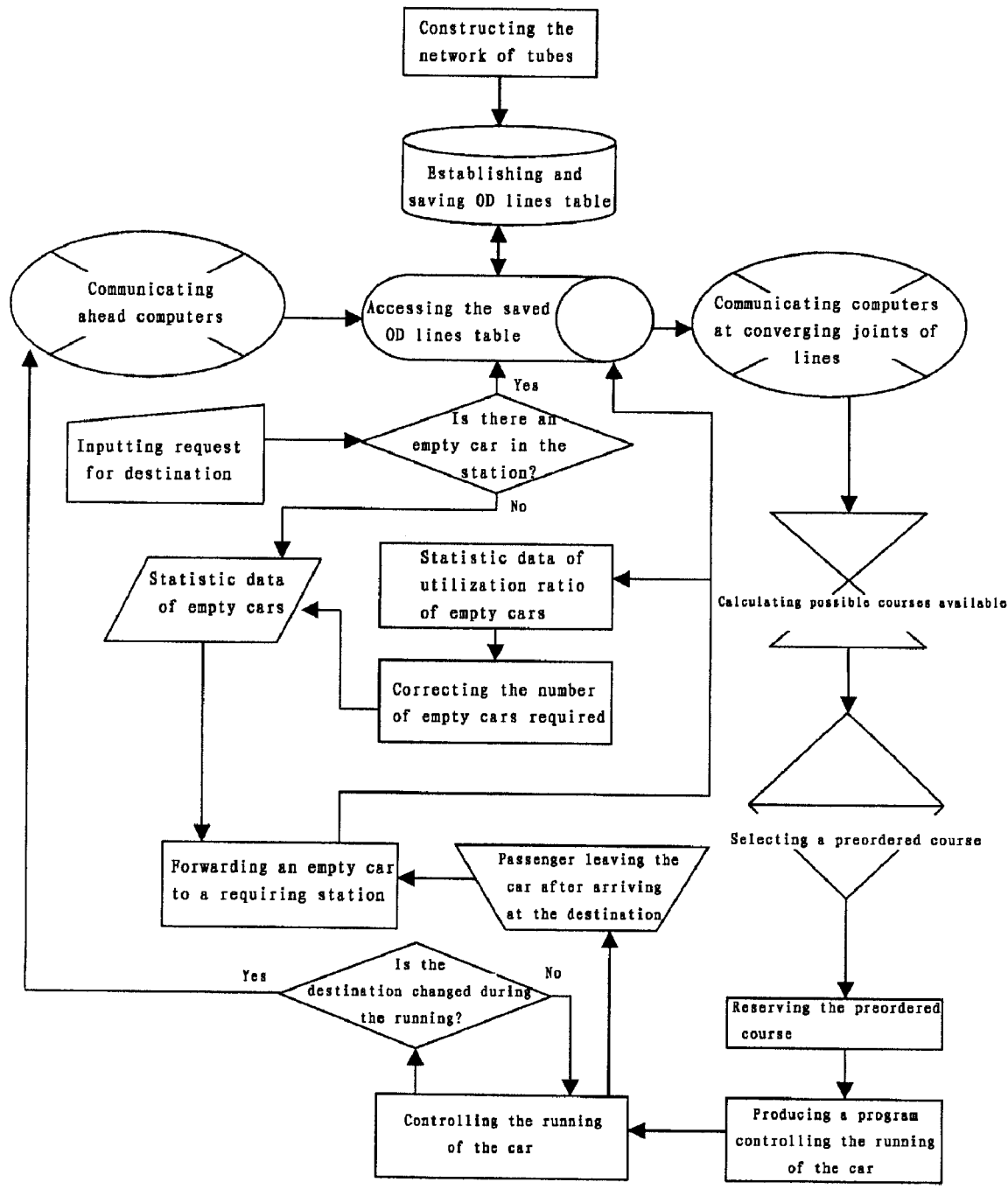
FIG. 24 is a flow chart for controlling the running of a tube car in the network of tubes.

As shown in FIG. 24, an example of the control method according to this invention is given in detail. The method comprises the following steps:

To establish tables including any possible courses from a starting place (or off point) to a related destination (hereafter called as "OD line table"): after or during the construction of said network of tubes, inter-communication among computers in all stations, converging joints and cars is establish according to IP addresses via routers. Then all related possible running courses are established in each computer along the tubes and saved as tables for future use. When the network of tubes are used, the control method of it may be as follows:

(1) Receiving an input request from a passenger in a station and calling an empty car: when the passenger operates a computer in the station, the computer will first determine whether there is an empty car in the station. If "yes", goes to the next step; if "no", the computer in the station will record the statistic data for an empty car required and sends the information of an empty car to other stations for the empty car.

(2) Accepting the passenger's request: after the passenger boards the empty car, he inputs information of the destination station into the computer in the car.

(3) Searching for all available and possible running courses: after the computer in the car receives the information of the destination station, it communicates the related computers in the related stations and converging joints via routers and IP addresses and search for any possible running courses from each OD line table saved in each of the related computers.

(4) Calculating available courses: the computer in the car obtains all reserved marks from the related computers, and calculate a table recording available courses.

(5) Selecting an appropriate line to run: the computer in the car ranks the available courses in the order of lengths of arriving time, and select the course needing the shortest time to run as the pre-ordered.

(6) Marking the pre-ordered course as a reserved course: after the pre-ordered course is selected, the computer will communicate with the related computers on the pre-ordered course so that these computers mark the reserved time and stations (the reserved time is marked in a state symbol "1"). The reserved time will not be available to other cars.

(7) Producing the control program for controlling the car running: after the pre-ordered course is selected, the computer in the car will immediately determine the running length and the arriving time of the car at each converging joint. Then the computer in the car will determine the program for running the car, such as the operations of the guide for rail-changing and brakes etc.

(8) Controlling the running of the car: after the program for running the car is produced, the computer in the car will sends control signals concerning start, acceleration, turn, deceleration and stop etc. to the servo driving mechanism such as the guide for rail-changing and brakes on the car to control the running of the car.

(9) Determining whether the destination is changed during the running: the computer in the car frequently check whether the passenger inputs any change information about the destination during the running, If "yes", steps from (3) to (8) are repeated; if "no", the car runs ahead to the destination station.

(10) After arriving at the destination station, the passenger leaves out of the car.

Control for standby empty cars:after the passenger leaves out of the car, the computer in the empty car immediately communicate with the computer in the nearby stations automatically. After the computer in the car receives the demand information for empty cars sent by the computer in a certain station, steps (3) to (8) are repeated, and the car arrives at the station requiring the empty car. The control of empty cars is similar to the running car. That is, the empty car will arrive at the station requiring the empty car along the course needing the shortest time between the car and the station requiring the empty car.

Obtaining statistic data of empty cars required: each computer in each station along the network of tubes automatically collect information about departing time and stations of cars according to regular intervals such as an hour, a day, a week, a month, a quarter, or a year and save the information in the related computers as the basis of feedback control on the amounts of empty cars stored.

Obtaining statistic data of the utilization ratio of empty cars:each computer in each station automatically calculates the utilization ratio of empty cars in this station.

Correcting the number of required empty cars:computer in each station corrects the number of required empty cars according to the utilization ratio of empty cars to balance the supply of standby empty bars and the demand for cars and make them closer. That is, feedback control is employed to control the distribution of empty cars.

Since the communicating speed of said internet is $10^6$ times faster than the maximum average speed of the tube car starting from the station and all the said computers can complete the course reservation again during the travel, this invention provides dynamic reservation services for passengers who change the destination during the travel so as to solve the problem incapable of changing the destination during the travel with the previous static line reserving technology.

Since the communication rate of internet is much faster, up to $10^6$ times, than the departing rate of cars from the station, the pre-ordered course may be changed by the computer in the car during the running of car. That is, a dynamic reservation that the pre-ordered course may be changed during the running of car is provided according to the invention, thereby solve the problem in the prior art, in which the reservation is static and destination cannot be changed during the running of car.

Since there is little "neck of bottle" in said network of tubes, the running car can adjust its traveling course to avoid any faulty line due to the help of dynamic reservation technology, the running stability of the whole system is improved. Meanwhile, contributed by the network of tubes, more possible courses are available between any two stations in the network of tubes. Therefore, a higher running efficiency can be obtained. And, with the increase of the network's size, the efficiency will be improved at a geometrical progression and approaches a balance state automatically.

Since said distributing control system and method adopt detachable module structure, the main mode and basic data of the whole control system will not be greatly influenced by changes of the network of tubes so as to suit the changes of networks caused by, for example, urban development. Therefore such control system and method have more flexibilities in practice.

Although the invention has been described in detail with reference to embodiments showing in drawings, the scope of the invention is not limited to the embodiments. Any changes, modifications, or equivalents within the spirit and principle of the invention will fall into the scope of the invention.

What is claimed is:

1. A network of tubes used in a personal transport system, comprising:
   a network of tubes, comprising a plurality of tubes,
   wherein the network of tubes is closed,
   each tube in the network of tubes has an upper rail and/or a lower rail for guiding a tube car,
   an airtight condition is established between the tube car and the network of tubes by airtight means provided between the inner surface of the tubes and the peripheral surface of the tube car,
   the airtight condition creates a piston effect, and
   the network of tubes includes normal-air-pressure low-speed tubes, each having the inner profile of the cross-section fitting to the outer profile of the cross-section of the tube car.

2. The network of tubes according to claim 1, wherein the network of tubes has a loop structure and includes single-layered or multi-layered tubes, and cars in tubes of each layer run in a single direction.

3. The network of tubes according to claim 2, wherein said tubes in each layer include a plurality of straight tubes and curved tubes.

4. The network of tubes according to claim 3, wherein the network of tubes includes said multi-layered tubes and said multi-layered tubes are overlapped and supported by support poles, and said straight and curved tubes form X-shape, N-shape or A-shape intersections of lines or entry/exit line loops.

5. The network of tubes according to claim 4, wherein said X-shape, N-shape or A-shape intersections of lines or entry/exit line loops fit to the existing blocks in cities.

6. The network of tubes according to claim 1, wherein each tube has an interlayer wall structure with light form materials filled in hollow space of the wall structure and a rail laid on an inner surface of the wall structure.

7. The network of tubes according to claim 1, wherein some video/audio signal transmission means are arranged on outer surfaces of the tubes.

8. The network of tubes according to claim 1, wherein the network of tubes includes low-air-pressure high-speed tubes, and the normal-air-pressure low-speed tubes and the low-air-pressure high-speed tubes are connected by pressure-transforming stopcocks.

9. The network of tubes according to claim 1, further comprising a plurality solar cell panels as power supply units arranged on an outer surface of the tubes.

10. The network of tubes according to claim 1, further comprising an anti-collision switch unit at each converging joint of lines.

11. The network of tubes according to claim 1, further comprising air release valves and air suction valves in the network of tubes.

12. A personal transport system comprising:
    tube cars, each tube car comprising:
       a self-powered closed car, and
       airtight means, on the peripheral surface of the car, and
    a network of tubes,
    wherein the car runs in tubes of the network of tubes,
    the network of tubes comprises a plurality of tubes,
    the network of tubes is closed,
    each tube in the network of tubes has an upper rail and/or a lower rail for guiding the car,
    the airtight means is configured to provide an airtight condition between the inner surface of the tubes and the peripheral surface of the car so as to create a piston effect when the tube car enters and runs in the network of tubes, and
    the network of tubes includes normal-air-pressure low-speed tubes, each having the inner profile of the cross-section fitting to the outer profile of the cross-section of the tube car.

13. The personal transport system according to claim 12, wherein said car can move forward or backward; and one to two seats are provided inside the car.

14. The personal transport system according to claim 12, wherein a guide for rail-changing is provided on said car.

15. The personal transport system according to claim 12, wherein the car is opaque without window.

16. The personal transport system according to claim 12, wherein the car further includes a video/audio signal transmission means including a digital information coding and transmitting means and a video/audio signal decoding and playing means, in which the digital information coding and transmitting means comprises one or more sending and receiving means of radio signals arranged on the car and said video/audio signal decoding and playing means comprises car-carrying video/audio playing means in the car.

17. A control system for controlling the personal transport system according to claim 12, comprises a plurality of computers provided in each station, each converging joint of two lines and each tube car with each computer having its own IP address and communicating with other computers via a network, in which:
    each computer in each station is used for collecting and controlling information about stored empty cars, and controlling entry/departure operations of cars;
    each computer at each converging joint of two lines is used for collecting and managing information related to cars running in the two lines, and monitoring and controlling the speeds of cars within the two lines to avoid collision of cars; and
    each computer in each tube car is used for collecting and managing information related to the each tube car and controlling the each tube car.

18. The control system according to claim 17, wherein tables recording courses from one station to another station are stored in the computers both in each station and in computers at each converging joint of two lines.

19. The control system according to claim 17, further comprising a plurality of arrival detectors provided along tubes of the network of tubes.

20. A control method for controlling the personal transport system according to claim 12, comprises the following step: during running of a car, a computer in the car checks whether a passenger inputs information about the destination, if information about the destination is input by the passenger, the computer in the car communicates with computers in stations and converging joints in the network of tubes, to order a running course; if any change in information about the destination is input by the passenger, the computer in the car communicates with the computers in the stations and the converging joints in the network of tubes to change the running course.

21. The personal transport system according to claim 12, wherein the network of tubes has overlapped two or more layers of tubes.

22. The personal transport system according to claim 12, wherein the airtight means of the car comprises one or more airtight rings provided on the outer surface of the tube car along the outer profile of the cross-section of the car.

23. A network of tubes used in a personal transport system, comprising:
    a network of tubes, comprising a plurality of tubes, wherein the network of tubes is closed,
    each tube in the network of tubes has an upper rail and/or a lower rail for guiding a tube car,
    an airtight condition is established between the tube car and the network of tubes by airtight means provided between the inner surface of the tubes and the peripheral surface of the tube car, and
    the airtight condition creates a piston effect,
    wherein a plurality of car storehouses with at least one station are provided near or within the network of tubes, each of the car storehouses includes:
    a vertical circulating rail,
    a horizontal moving beam for hanging and moving tube cars,
    a driving mechanism,
    a platform backing plate,
    a walking bridge, and
    a station control computer,
    wherein the walking bridge is supported by the station and connected with a building's doors or windows, and
    a tube car can move along the vertical circulating rail under the drive of the driving mechanism and the action of the horizontal moving beam.

24. A personal transport system comprising:
    a tube car used in a personal transport system, comprising a self-powered closed car, wherein the car is supported and/or guided by an upper rail and/or a lower rail provided in each tube of a closed network of tubes, and an airtight condition will be established between the tube car and the tubes of the network, when the tube car enters and runs in the network of tubes; and
    a network of tubes, wherein the car runs in tubes of the network of tubes, the network of tubes comprises a plurality of tubes, the network of tubes is closed, each tube in the network of tubes has an upper rail and/or a lower rail for guiding the car, an airtight condition is established between the car and the tubes of the network of tubes when the car enters and runs in the network of tubes,
    wherein the network of tubes includes normal-air-pressure low-speed tubes, each having the inner profile of the cross-section fitting to the outer profile of the cross-section of the tube car to thereby form the piston effect among cars in the tube, and
    wherein an airtight ring is provided on the outer surface of the tube car along the outer profile of the cross-section of the car to cover slits between the inner surface of the tube and the profile of the car when two cars approach each other rapidly so as to form said piston effect.

* * * * *